United States Patent
Smeller

(10) Patent No.: US 9,933,792 B2
(45) Date of Patent: Apr. 3, 2018

(54) METHOD AND APPARATUS FOR FLOW REGULATION

(71) Applicant: Lancer Corporation, San Antonio, TX (US)

(72) Inventor: Donald W. Smeller, Converse, TX (US)

(73) Assignee: Lancer Corporation, San Antonio, TX (US)

( * ) Notice: Subject to any disclaimer, the term of this patent is extended or adjusted under 35 U.S.C. 154(b) by 38 days.

(21) Appl. No.: 15/063,888

(22) Filed: Mar. 8, 2016

(65) Prior Publication Data

US 2016/0282883 A1    Sep. 29, 2016

Related U.S. Application Data

(60) Provisional application No. 62/177,775, filed on Mar. 23, 2015.

(51) Int. Cl.
| | | |
|---|---|---|
| *F15D 1/02* | (2006.01) | |
| *G05D 11/03* | (2006.01) | |
| *G05D 7/01* | (2006.01) | |
| *B67D 1/12* | (2006.01) | |

(52) U.S. Cl.
CPC ............ *G05D 11/03* (2013.01); *B67D 1/1281* (2013.01); *G05D 7/012* (2013.01)

(58) Field of Classification Search
USPC .............................................. 138/43, 45, 46
See application file for complete search history.

(56) References Cited

U.S. PATENT DOCUMENTS

| | | | |
|---|---|---|---|
| 2,829,674 A | 4/1958 | Segelhorst et al. | |
| 2,936,788 A * | 5/1960 | Dahl ..................... | G05D 7/012 138/45 |
| 2,953,168 A * | 9/1960 | Vomacka ............. | G05D 7/0113 137/517 |
| 2,960,109 A * | 11/1960 | Wilson ................. | G05D 7/0133 137/513.3 |
| 3,332,436 A * | 7/1967 | Welty ................... | G05D 7/0126 137/468 |
| 3,371,685 A | 3/1968 | Tinley | |
| 3,409,050 A | 11/1968 | Weese | |
| 3,630,236 A * | 12/1971 | Diggs .................. | B05B 1/3006 138/45 |
| 3,825,224 A * | 7/1974 | Remane ................... | F16K 1/38 137/625.3 |
| 3,826,463 A | 7/1974 | Beauregard | |

(Continued)

*Primary Examiner* — James Hook
(74) *Attorney, Agent, or Firm* — Christopher L. Makay

(57) ABSTRACT

A flow regulator system includes a flow regulator placed within a fluid flow path to maintain fluid flow therethrough at a desired flow rate. The flow regulator includes a flow washer having an orifice therethrough and a regulator body that receives the flow washer. At fluid pressures between a first fluid pressure and a second fluid pressure, the flow washer rotationally deforms to decrease or increase the size of the orifice, thereby maintaining the desired flow rate. When fluid pressure is greater than or equal to the second fluid pressure, the flow washer contacts a portion of the regulator body to prevent further rotational deformation of the flow washer. In addition, the flow washer radially compresses or expands to increase or decrease the size of the orifice, thereby maintaining the desired flow rate.

21 Claims, 23 Drawing Sheets

(56) References Cited

U.S. PATENT DOCUMENTS

| | | | |
|---|---|---|---|
| 4,457,343 A | 7/1984 | Zakausky | |
| 4,592,390 A | 6/1986 | Boyd | |
| 4,648,424 A * | 3/1987 | Takahashi | B67D 1/12 137/504 |
| 4,667,700 A * | 5/1987 | Buzzi | F16K 17/34 137/517 |
| 4,741,355 A | 5/1988 | Credle, Jr. et al. | |
| 4,883,093 A | 11/1989 | Miles et al. | |
| 4,938,259 A * | 7/1990 | Schmidt | F16K 17/34 137/517 |
| 5,121,855 A | 6/1992 | Credle, Jr. | |
| 5,226,446 A | 7/1993 | Cooper | |
| 5,244,009 A * | 9/1993 | Raab | B67D 1/14 137/503 |
| 5,487,528 A * | 1/1996 | Richmond | F16K 31/404 138/42 |
| 6,328,181 B1 | 12/2001 | Schroeder et al. | |
| 6,435,375 B2 | 8/2002 | Durham et al. | |
| 2004/0187928 A1 | 9/2004 | Ambrosina et al. | |
| 2006/0086399 A1* | 4/2006 | Bailey | G05D 7/0106 138/45 |
| 2013/0056493 A1 | 3/2013 | Newton et al. | |

\* cited by examiner

"PRIOR ART"

"PRIOR ART"

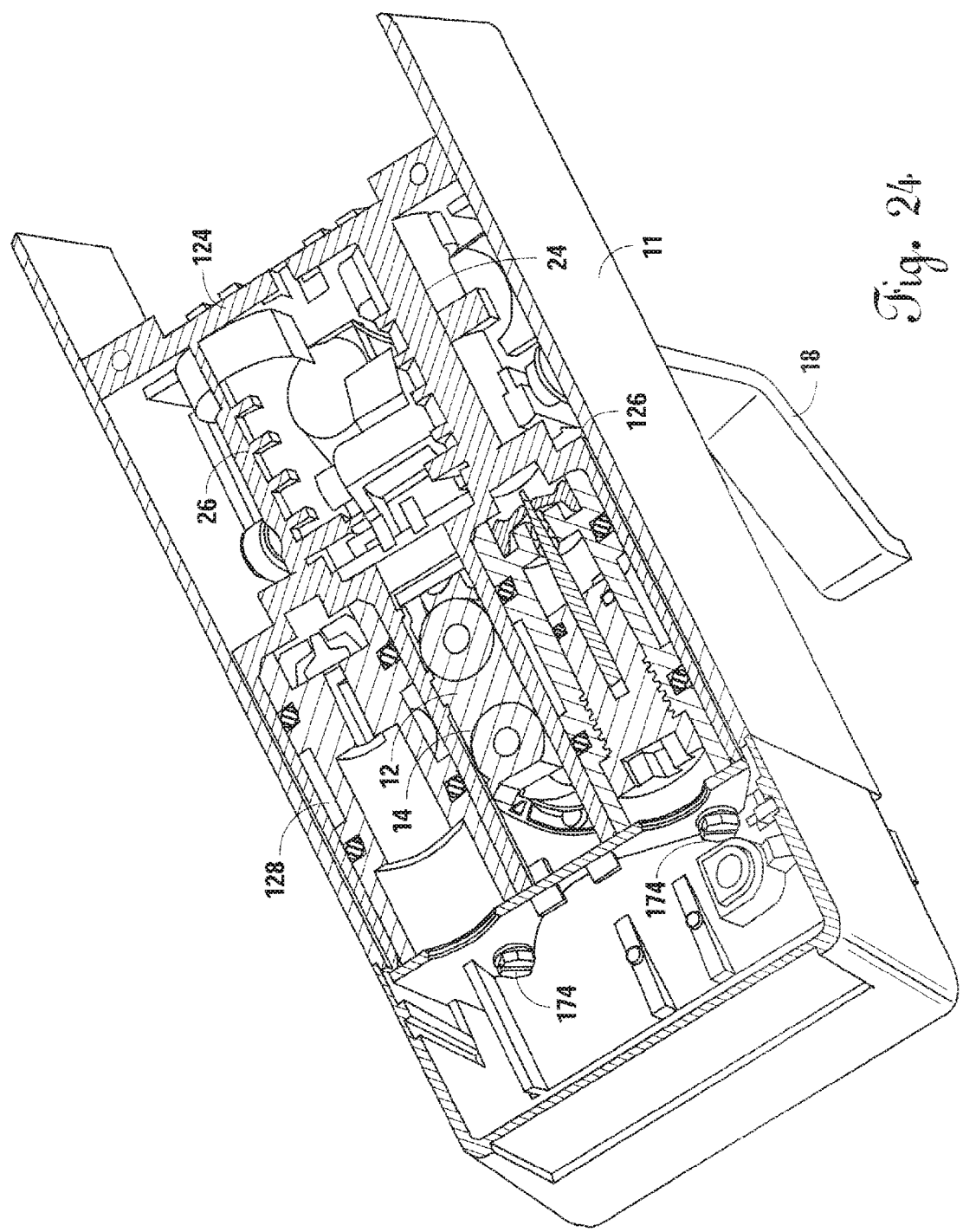

METHOD AND APPARATUS FOR FLOW REGULATION

BACKGROUND OF THE INVENTION

1. Field of the Invention

The present invention relates generally to flow regulators, and, more particularly, but not by way of limitation, to flow regulators that incorporate a flow washer to maintain a desired flow rate over a greater range of fluid pressures.

2. Description of the Related Art

Flow regulators are used in many applications to control the flow rate of fluid through a conduit such that the flow rate of the fluid is uniform under varying pressure conditions. In many flow regulators, flow washers are incorporated for the purpose of maintaining flow rate. Flow washers are typically discs constructed of a flexible resilient material that have a central orifice extending therethrough. The central orifice of the flow washer distorts to different diameters under different pressure conditions. Specifically, the size of the diameter of the orifice reduces as the source pressure is elevated.

FIGS. 1 and 2 illustrate a flow washer 600 well known in the art. The flow washer 600 is designed to maintain a uniform flow rate after an initial threshold pressure is reached. In particular, fluid is allowed to pass through an orifice 601 of the flow washer until an initial threshold pressure is reached. After this initial threshold pressure is reached further pressure increases cause the flow washer 600 to deform reducing the diameter of the orifice 601. As illustrated in FIG. 2, further pressure increases after the initial threshold pressure deforms the flow washer 600 such that the orifice 601 is reduced in diameter, thereby maintaining a desired flow rate with the increase in pressure.

In many applications, flow washers are limited in their use because they can only regulate the flow rates of fluids over a limited range of pressures. For example, in a typical flow washer, the operating range of the flow washer with respect to pressure is limited, and, once the pressure increases beyond the operating range, the flow rate rapidly decreases. As illustrated in FIG. 3, as the pressure increases beyond the operating range, the diameter of the orifice reduces to a point where flow rate is rapidly decreased. What is desired in many applications is a flow washer that maintains the fluid flow rate more or less the same over a greater range of pressures.

Beverage dispensers are one application that requires the regulation of fluid flow rate over a range of pressures. In order for a beverage dispenser to create a proper tasting fountain drink, a beverage dispenser must maintain the correct water to syrup ratio. To achieve the proper water to syrup ratio, a beverage dispenser must regulate the flow rate of water and syrup. Maintaining the correct water to syrup ratio can be difficult to achieve for beverage dispensers. For example, water pressure varies depending upon location and also may be affected by the number of users dispensing a drink from a beverage dispenser. In order to achieve the correct water to syrup ratio regardless of water pressure, beverage dispensers use ceramic flow regulators employing a ceramic sleeve and piston. The ceramic flow regulators use a ceramic sleeve with side holes and a spring-loaded ceramic piston that moves and occludes the side holes in response to pressure changes. Beverage dispensers that employ ceramic flow regulators are effective in regulating flow of water and syrup over a given range of pressures to create a proper tasting dispensed beverage. However, ceramic flow regulators are expensive to manufacture. Replacing the ceramic flow regulator with a manual valve that uses a flow regulator incorporating a flow washer would be one way to control the costs of manufacturing a beverage-dispensing machine.

Accordingly, a flow regulator that incorporates a flow washer to maintain a desired fluid flow rate over a greater range of pressures would be useful. Furthermore, a beverage dispenser that integrates a flow regulator incorporating a flow washer would be an improvement in the beverage dispensing industry.

SUMMARY OF THE INVENTION

In accordance with the present invention, a flow regulator of a flow regulator system is placed within a fluid flow path. The flow regulator includes a flow washer and a regulator body that receives the flow washer therein.

The flow washer includes a plate disposed on a support wall. The plate includes an orifice therethrough, an inlet surface, and an outlet surface. The outlet surface of the plate and the support wall define a cavity therebetween. The regulator body includes a flow washer seat that receives the flow washer therein, a diffuser assembly disposed in the flow washer seat, and a fluid conduit including a fluid conduit inlet and a fluid conduit outlet. The flow washer seat includes a wall and a flow washer receiving surface adjoining the wall. The support wall of the flow washer resides on the flow washer receiving surface adjacent the wall. The diffuser assembly includes a diffuser disposed centrally in the flow washer seat, at least one flow washer stop adjacent the diffuser, and at least one diffuser channel. Furthermore, once the flow washer receives the flow washer, the diffuser assembly and the flow washer define a circumferential channel. The flow washer, the diffuser assembly, and the fluid conduit inlet form a delivery path wherein the orifice of the flow washer communicates with the delivery path to transport fluid to the diffuser assembly and the fluid conduit inlet. Specifically, the orifice of the flow washer communicates with the diffuser assembly such that the diffuser transports fluid from the orifice of the flow washer into the diffuser channel and the diffuser channel transports fluid into the circumferential channel.

Once the flow regulator system is placed within the fluid flow path, fluid flowing through the fluid flow path contacts the flow washer. In contacting the flow washer, the fluid strikes the inlet surface of the plate creating pressure on the plate. In particular, pressure created on the inlet surface of the plate forces fluid through the orifice of the flow washer and into the delivery path. Fluid entering the delivery path fills the circumferential channel such that the fluid equalizes fluid pressure within the cavity of the flow washer. Equal pressure within the cavity of the flow washer stabilizes the flow of fluid through the flow washer and prevents vibration of the flow washer within the flow washer seat. Furthermore, fluid collected in the circumferential channel enters the fluid conduit inlet for conveyance to the fluid conduit outlet via the fluid conduit.

The flow washer and the regulator body maintain fluid flowing through the fluid flow path at a desired flow rate by increasing and decreasing the size of the orifice of the flow washer. In particular, at fluid pressures between a first fluid pressure and a second fluid pressure, the flow washer rotationally deforms such that the support wall rotates to increase or decrease the size of the orifice. Specifically, fluid flowing through the flow path and contacting the inlet surface of the plate creates fluid pressures between the first fluid pressure and the second fluid pressure. The support wall of the flow washer in response to increasing fluid pressures rotates inwardly around an inner rim to decrease the diameter of the orifice thereby maintaining the desired flow rate of fluid within the fluid flow path. Conversely, the support wall of the flow washer in response to decreasing fluid pressures rotates outwardly around an inner rim to increase the diameter of the orifice thereby maintaining the desired flow rate of fluid within the fluid flow path.

When fluid flowing through the flow path and contacting the inlet surface of the plate creates fluid pressures greater than or equal to the second fluid pressure, the flow washer contacts a portion of the regulator body to prevent further rotational deformation of the flow washer. Specifically, the flow washer stop engages the flow washer at fluid pressures greater than or equal to the second fluid pressure to prevent a rotation of the support wall that decreases the size of the orifice due to rotational deformation. Furthermore, in response to increasing fluid pressures, fluid accumulates between the support wall of the flow washer and the wall of the flow washer seat such that the flow washer radially compresses to decrease the size of the orifice. Conversely, in response to decreasing fluid pressures, fluid decreases between the support wall of the flow washer and the wall of the flow washer seat such that the flow washer radially expands increasing the size of the orifice.

In addition, to the above-stated features, the diffuser of the diffuser assembly may be adjustable such that the diffuser may extend or retract into the orifice of the flow washer. Specifically, the regulator body includes a fluid chamber communicating with the fluid conduit outlet of the fluid conduit and the diffuser assembly includes a base installed within the fluid chamber. The base is linearly adjustable within the fluid chamber such that linearly adjusting the base extends or retracts the diffuser. More particularly, the diffuser includes a shaft disposed within the base and a tip such that linear adjustment of the base either extends or retracts the tip into the orifice of the flow washer. Extending the tip of the diffuser into the orifice decreases the fluid flow rate within the fluid flow path. Conversely, retracting the tip from the orifice of the flow washer increases the fluid flow rate within the fluid flow path.

A flow regulator system as described above may be adapted to allow the combination of a first fluid with a second fluid such that the first fluid and the second fluid combine at a desired flow rate ratio. In this system, a first flow regulator is placed within a first fluid flow path having the first fluid flowing therethrough. The first flow regulator is non-adjustable and maintains the first fluid flowing through the first fluid flow path at a first flow rate. A second flow regulator is placed within a second fluid flow path having a second fluid flowing therethrough. The second flow regulator is adjustable such that a flow rate of the second fluid flowing through the second flow path may be adjusted to a second flow rate relative to the first flow rate that maintains the desired flow rate ratio.

The flow regulator described above includes a method of achieving a desired flow rate ratio between a first fluid flow path and a second fluid slow path. The method provides a non-adjustable flow regulator and an adjustable flow regulator. The non-adjustable flow regulator is placed within a first fluid flow path and the adjustable flow regulator is placed within a second fluid flow path. The flow rate of fluid through the first fluid flow path is measured. The desired flow rate ratio between the first fluid flow path and the second fluid flow path is calculated using the measured flow rate through the first fluid flow path. The adjustable flow regulator within the second fluid flow path is adjusted such that the fluid flowing through the second fluid flow path is delivered at a rate that gives the desired flow rate ratio between the first fluid flow path and the second fluid flow path.

BRIEF DESCRIPTION OF DRAWINGS

FIGS. 11A-11C are cross-sectional views illustrating the operation of the non-adjustable flow regulator.

FIGS. 16A-16C are cross-sectional views illustrating the operation of the adjustable flow regulator.

FIG. 24 is a cross-sectional plan view of the beverage dispenser valve sub-assembly illustrating the upper valve body of the beverage dispenser valve sub-assembly.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 4:
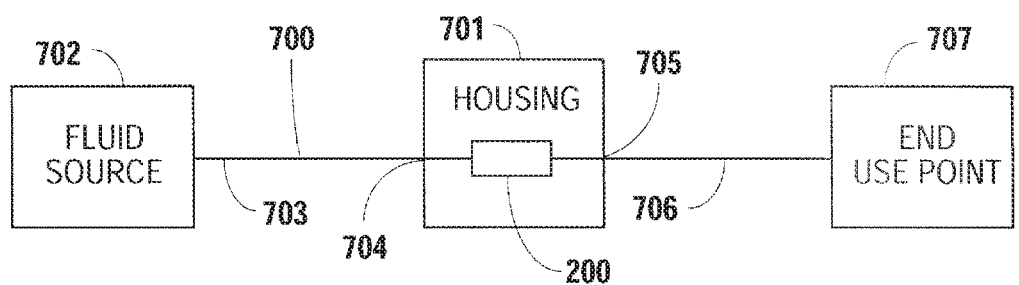
FIGS. 4-6 are block diagrams illustrating a modular flow regulator system.
Figure 5:
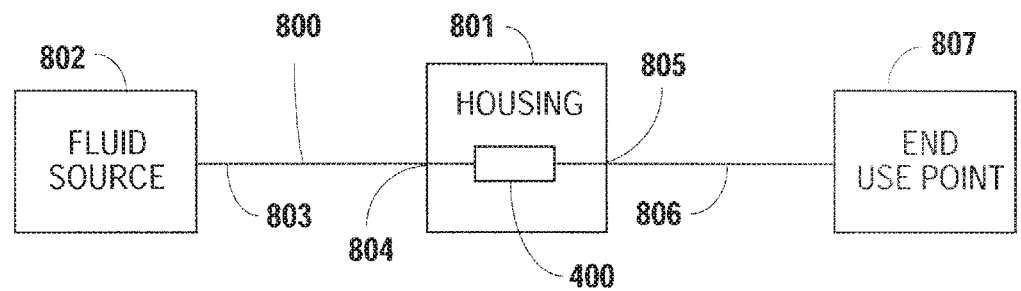
Figure 6:
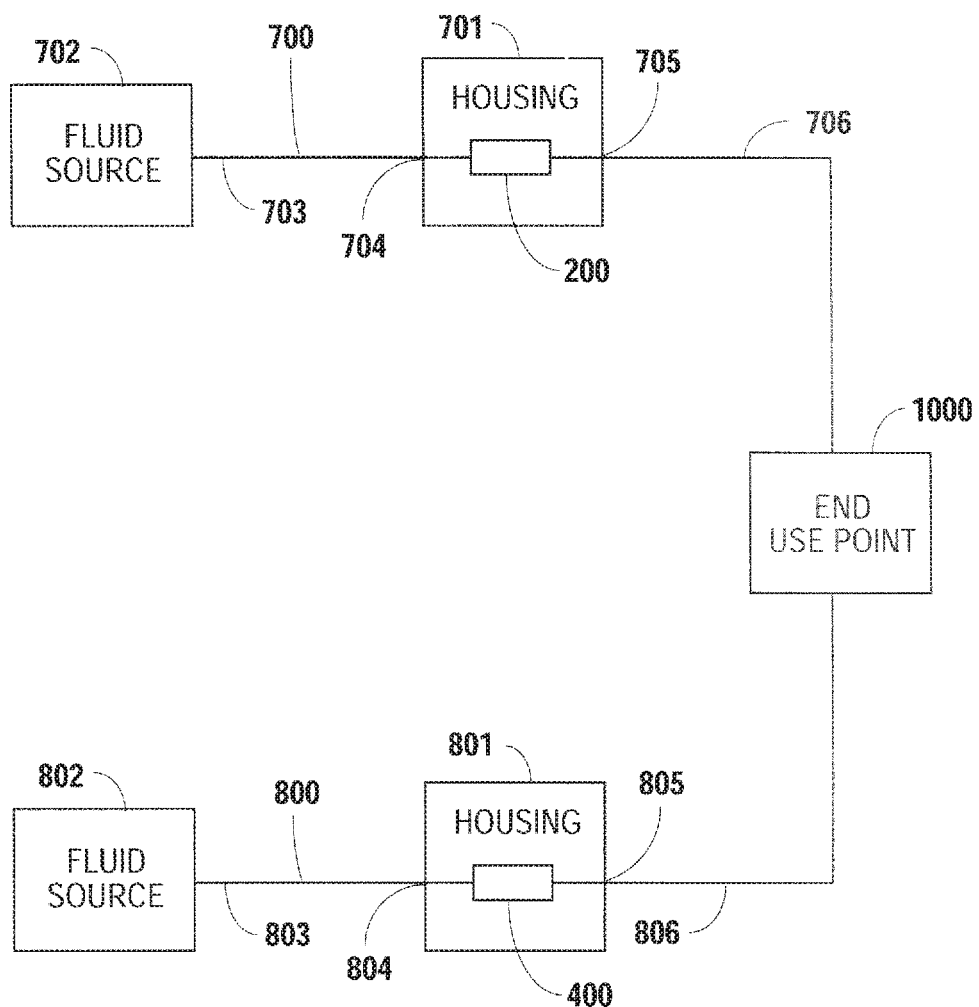
Figure 7:
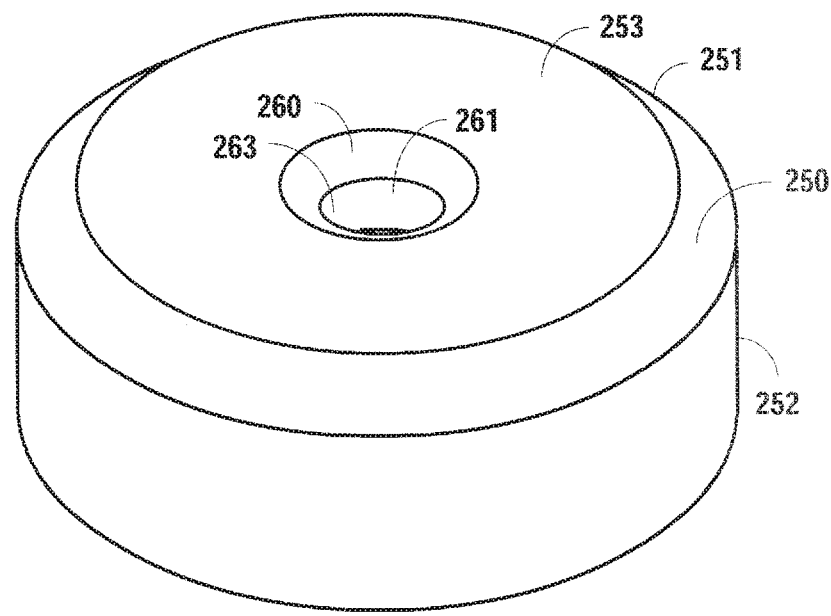
FIG. 7 is a top perspective view illustrating a flow washer of a non-adjustable flow regulator.
Figure 8:
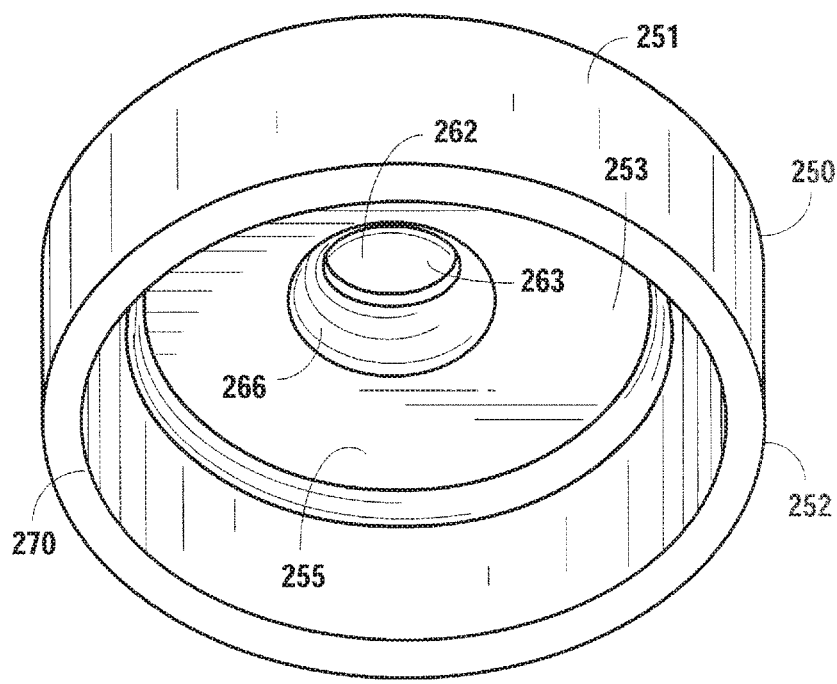
FIG. 8 is a bottom perspective view illustrating the flow washer of the non-adjustable flow regulator.

FIGS. 4-6 illustrate modular flow regulator system 1 including a flow regulator 200 and a flow regulator 400. The flow regulator 200 and the flow regulator 400 of the modular flow regulator system 1 are in fluid communication with a fluid flow path 700 and 800. In particular, the flow regulator 200 inserts within a housing 701 that is within the fluid flow path 700 and the flow regulator 400 inserts within a housing 801 that is within the fluid flow path 800. The fluid flow path 700 receives fluid from a fluid source 702 that flows through a fluid line 703 and into an inlet 704 in the housing 701. From the inlet 704 the fluid flows through the flow regulator 200 and exits out an outlet 705 of the housing 701. After exiting the housing 701 the fluid flows through a fluid line 706 and to an end use point 707. The fluid flow path 800 receives fluid from a fluid source 802 that flows through a fluid line 803 and into an inlet 804 in the housing 801. From the inlet 804 the fluid flows through the flow regulator 400 and exits out an outlet 805 of the housing 801. After exiting the housing 801 the fluid flows through a fluid line 806 and to an end use point 807.

When inserted within the housings 701 and 801 the flow regulator 200 and the flow regulator 400 "maintain" a desired flow rate over a range of pressures within the fluid flow paths 700 and 800, respectively. The flow regulator 200 maintains a desired flow rate within a static range of pressures. Conversely, the flow regulator 400 is dynamic in that it can adjust the range of pressures where it maintains the desired flow rate. The flow regulator 200 and the flow regulator 400 can be inserted within a system individually as illustrated in FIGS. 4 and 5 or can be combined as illustrated in FIG. 6. By combining the flow regulator 200 and the flow regulator 400, the modular flow regulator system 1 can "synchronize" a flow rate between two fluid sources and combine the fluid sources at an end use point 1000 such as a beverage dispensing valve.

FIGS. 7-11C illustrate the flow regulator 200. The flow regulator 200 includes a flow washer 250 and a regulator body 300. The flow regulator 200 inserts into the housing 701 and aligns with the fluid flow path 700 to maintain a desired flow rate within the fluid flow path 700 over a range of pressures.

FIGS. 7, 8, and 11A-11C illustrate the flow washer 250. The flow washer 250 is made from any suitable material that allows the flow washer 250 to be durable but also to deform under pressure, such as fluoroelastomers. Deformation under pressure allows the flow washer 250 to maintain a desired flow rate over a range of pressures and will be explained in greater detail herein.

The flow washer 250 includes a body 251 having a support wall 252 and a plate 253. The support wall 252 and the plate 253 form a cavity 255. In the preferred embodiment, the support wall 253 is substantially cylindrical in shape and the plate 253 resides atop the support wall 252. The plate 253 includes an inlet surface 260, an inlet 261, an outlet surface 266, and an outlet 262. The plate 253 further includes an orifice 263 of constant diameter extending through the plate 253. The inlet 261 allows fluid to enter the orifice 263 and the outlet 262 allows fluid to exit the orifice 263. Furthermore, the orifice 263 allows fluid striking the inlet surface 260 to pass therethrough and into the cavity 255. In particular, fluid striking the inlet surface 260 causes pressure to build on the inlet surface 260. This pressure in turn forces the fluid into the inlet 261 and through the orifice 263. After passing through the orifice 263, fluid exits the outlet 262 and enters the cavity 255.

Figure 9:
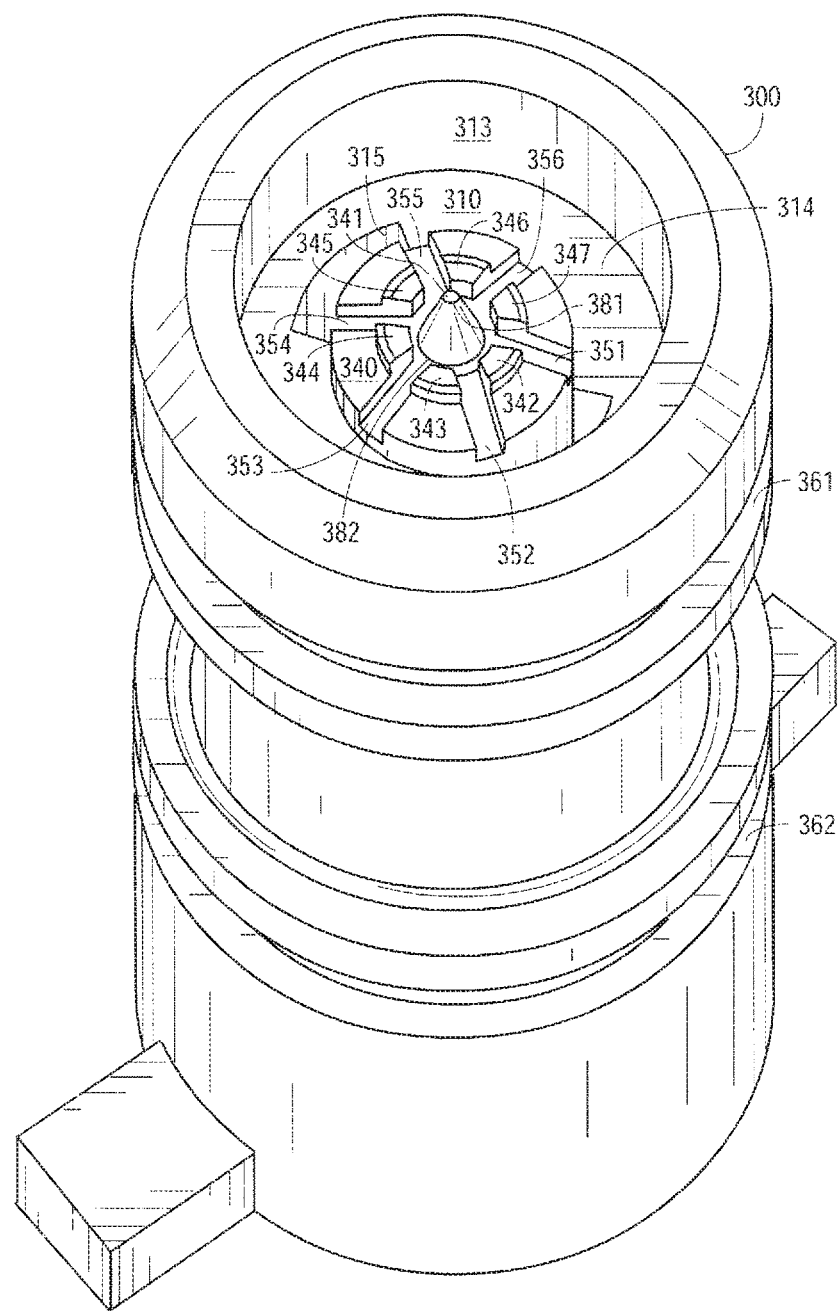
FIG. 9 is a perspective view illustrating a regulator body of the non-adjustable flow regulator.
Figure 10:
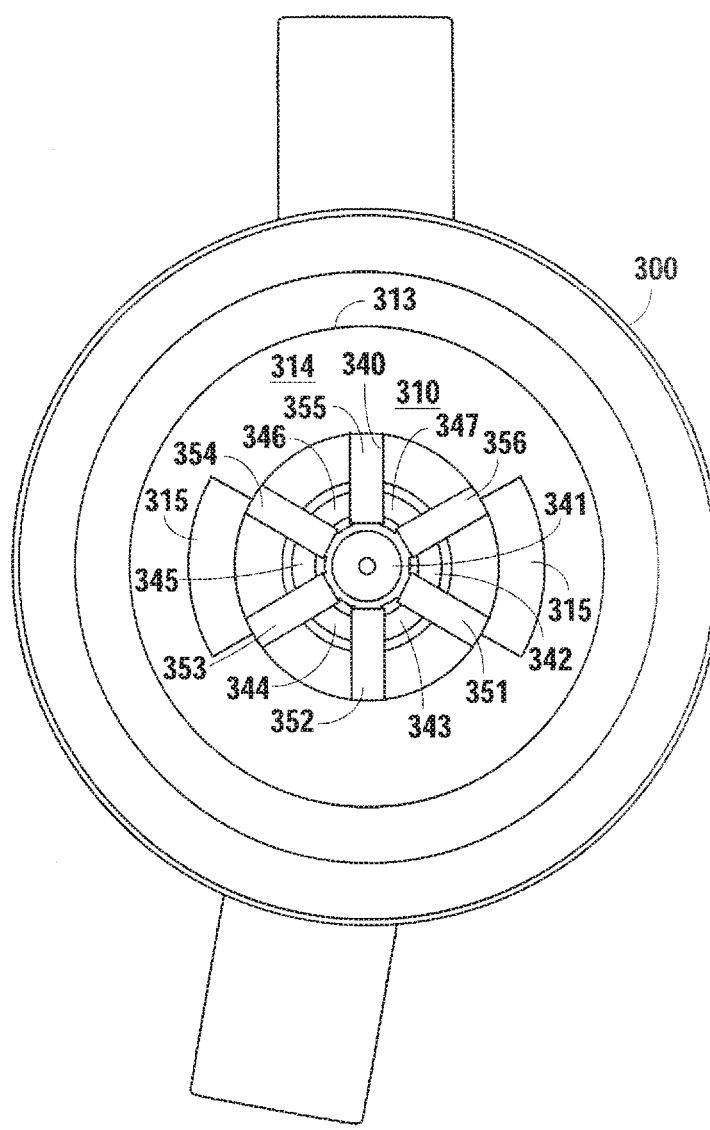
FIG. 10 is a top view illustrating the regulator body of the non-adjustable flow regulator.
Figure 11B:
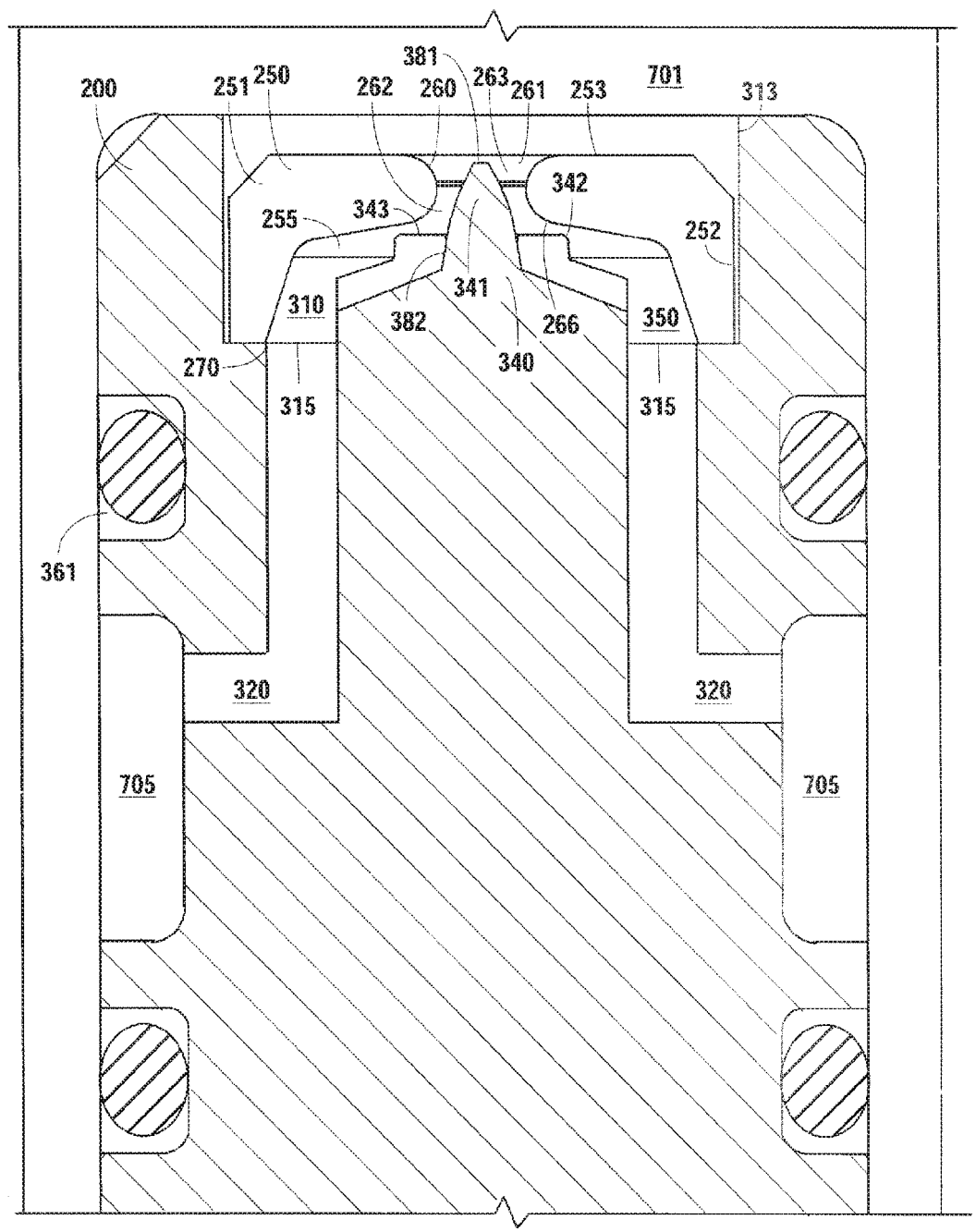
Figure 11B:
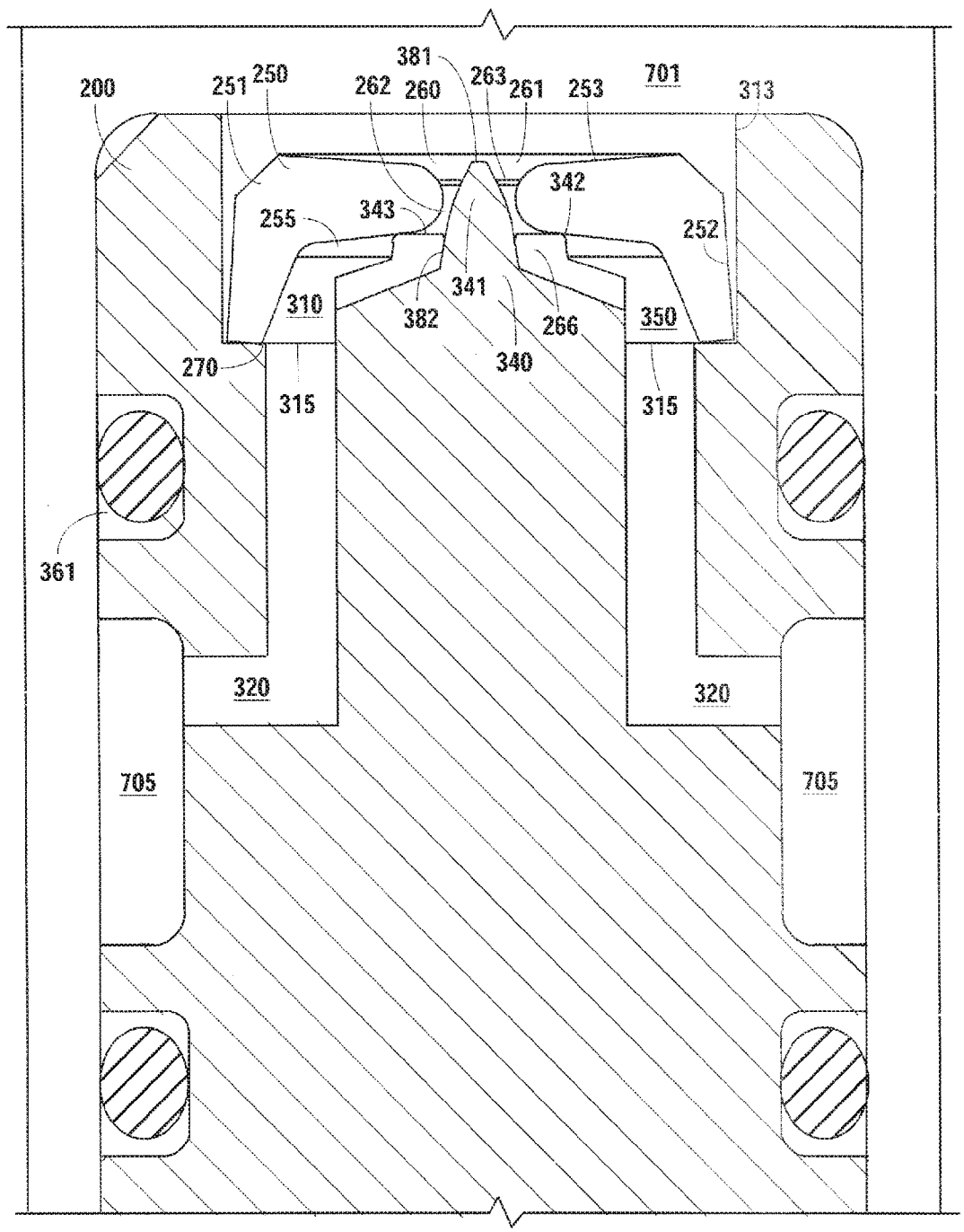

FIGS. 9-11 illustrate the regulator body 300. The regulator body 300 includes a flow washer seat 310, fluid conduits 320, and grooves 361 and 362 for receiving O-rings therein. The flow washer seat 310 receives the flow washer 250 and includes a wall 313, a flow washer-receiving surface 314, fluid conduit inlets 315, and a diffuser assembly 340.

The diffuser assembly 340 resides inside a central portion of the flow washer seat 310 and includes a diffuser 341, flow washer stops 342-347, and diffuser channels 351-356. The diffuser 341 is designed to distribute liquid into the diffuser channels 351-356. The diffuser 341 includes a first end 381 and a second end 382, wherein the cross-sectional area of the diffuser 341 gradually increases from the first end 381 to the second end 382. The flow washer stops 342-347 engage the flow washer 250 to prevent further deformation of the flow washer 250 after a second pressure is reached. The operation of the flow washer stops 342-347 will be explained in greater detail herein.

The flow regulator 200 is assembled in the following manner O-rings insert within the grooves 361 and 362 to provide a seal between the flow regulator 200 and the housing 701. The flow washer 250 aligns with the flow washer seat 310 such that the orifice 263 of the flow washer 250 resides above the diffuser 341. The flow washer 250 installs within the flow washer seat 310 such that its support wall 252 abuts the wall 313 and the flow washer-receiving surface 314. Once the flow washer 250 installs within the flow washer seat 310, the support wall 252 of the flow washer 250 surrounds the fluid conduit inlets 315 of the flow washer seat 310. As a result of surrounding the fluid conduit inlets 315 of the flow washer seat 310, the flow washer 250 and the diffuser assembly 340 form a circumferential channel 350 that receives fluid from the diffuser channels 351-356. Furthermore, the outlet surface 266 of the flow washer 250 and the diffuser assembly 340 forms a delivery path that transports fluid into the circumferential channel 350.

After assembly, the flow regulator 200 inserts within the housing 701 such that the flow regulator 200 aligns with the inlet 704. Specifically, the flow regulator 200 inserts within the housing 701 such that the flow washer seat 310 with the flow washer 250 installed, aligns with the inlet 704 leading from the fluid line 703. Furthermore, the fluid conduits 320 of the flow regulator 200 align with the outlet 705. Once inserted into the housing 701, the flow regulator 200 transports fluid from the inlet 704 to the outlet 705.

The flow regulator 200 operates in the following manner to transport fluid from the inlet 704 to the outlet 705. Fluid exits the fluid source 702 and begins flowing through the fluid line 703. Fluid enters the inlet 704 of the housing 701 where the fluid contacts the flow washer 250. Upon contacting the flow washer 250, fluid strikes the inlet surface 260 of the flow washer 250 resulting in fluid pressure beginning to build on the inlet surface 260. As pressure begins to build on the inlet surface 260, fluid is forced into the inlet 261 and through the orifice 263 of the flow washer 250. After passing through the orifice 263, the fluid exits the outlet 265 and enters the cavity 255. Once the fluid enters the cavity 255, the fluid is conveyed to the circumferential channel 350 by the delivery path described above. In the preferred embodiment, the fluid contacts the diffuser 341 and moves from the first end 381 to the second end 382 of the diffuser 341. From the second end 382 of the diffuser 341, the fluid disperses into the diffuser channels 351-356. From the diffuser channels 351-356, the fluid is transported to and collected in the circumferential channel 350. The fluid fills the circumferential channel 350, thereby equalizing the fluid pressure within the cavity 255 of the flow washer 250. This equalization of fluid pressure stabilizes the flow of fluid through the flow washer 250 and prevents vibration of the flow washer 250 within the flow washer seat 310. Furthermore, fluid collected in the circumferential channel 350 exits the circumferential channel 350 and enters the conduit inlet 315 for conveyance to the outlet 705 via the fluid conduits 320. The fluid exits the outlet 705 and is conveyed by the fluid line 706 to the end source 707.

In addition to transporting fluid from the inlet 704 to the outlet 705 of the housing 701, the flow regulator 200 also regulates the fluid flow rate over a range of pressures. Regulation of the fluid flow rate begins when fluid pressure caused by the fluid striking the inlet surface 260 of the flow washer 250 reaches an initial first pressure. The flow regulator 200 continues to regulate the fluid flow rate even after a second pressure normally associated with flow washers is reached.

Once fluid pressure caused b the fluid striking the inlet surface 260 of the flow washer 250 increases to a point where the initial first pressure is reached, the flow washer 250 rotationally deforms to maintain a desired flow rate between the initial first pressure and the second pressure. Specifically, between the initial first pressure and the second pressure, the support wall 252 rotates around an inner rim 270 to increase or decrease the diameter of the orifice 163 to maintain the desired flow rate. Pressure increases beyond the initial first pressure cause the support wall 252 to rotate inwardly around the inner rim 270 of the support wall 252 until the second pressure is reached. As illustrated in FIG. 11B, the inward rotation of the support wall 252 deforms the flow washer 250 such that the orifice 263 decreases in diameter. Conversely, decreases in pressure between the second pressure and the initial first pressure causes the support wall 252 to rotate outwardly around the inner rim 70 of the support wall 252 until the initial first pressure is reached. The outward rotation of the support wall 252 deforms the flow washer 250 such that the orifice 263 increases in diameter.

Figure 11C:
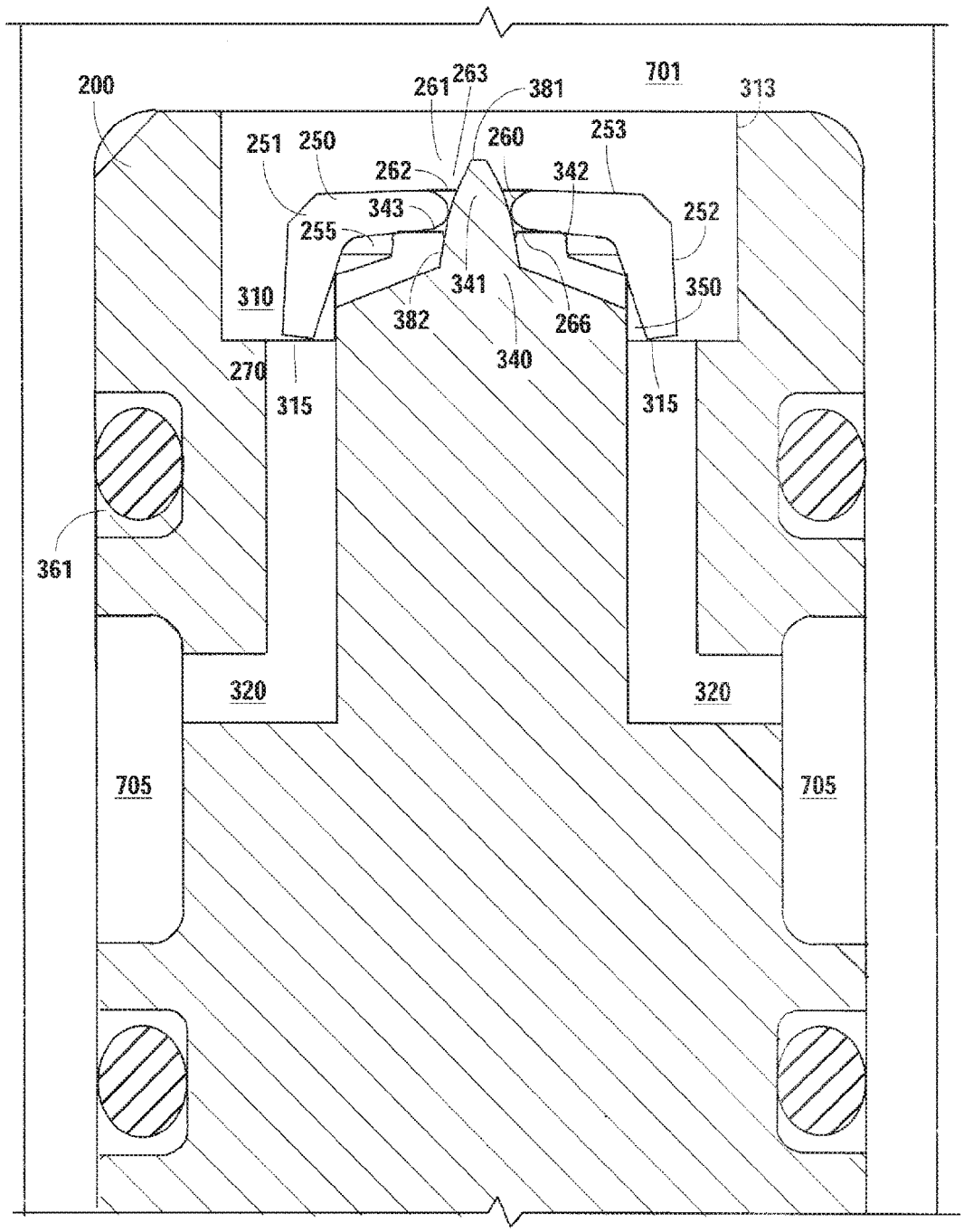
Figure 12:
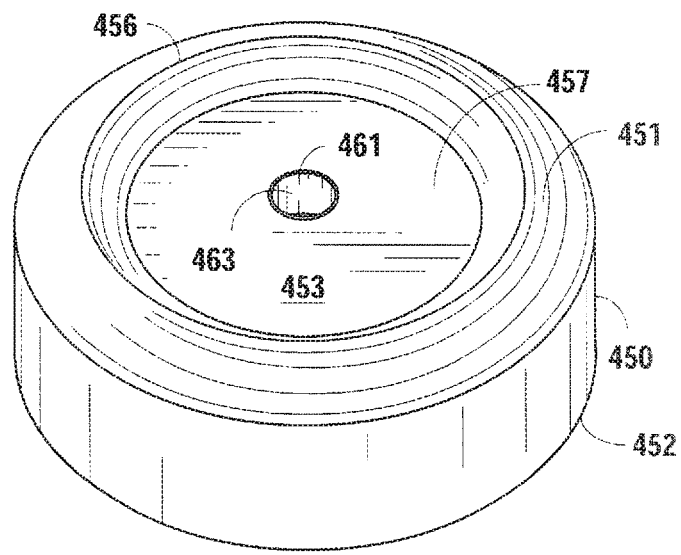
FIG. 12 is a top perspective view illustrating a flow washer of a adjustable flow regulator.
Figure 13:
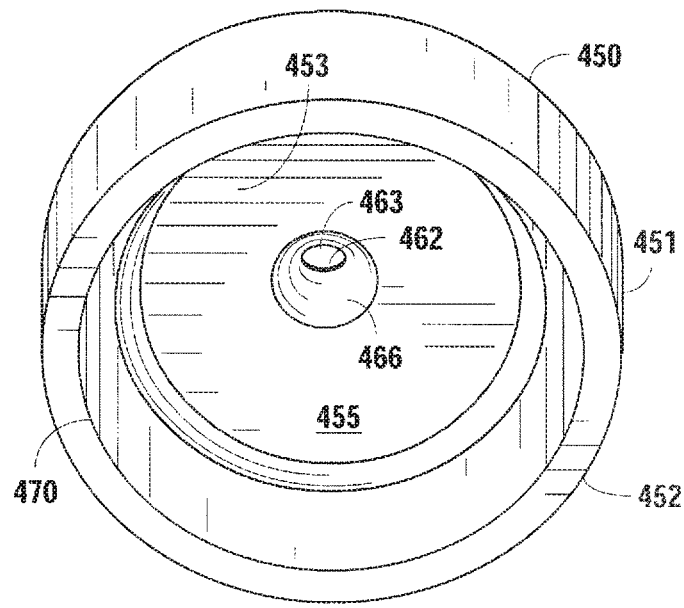
FIG. 13 is a bottom perspective view illustrating the flow washer of the adjustable flow regulator.

Once pressure increases beyond the second pressure, the flow washer 250 in combination with the flow washer stops 342-347 allows the flow washer 250 to continue to maintain the desired flow rate. After the second pressure is reached, the flow washer stops 342-347 engage the flow washer 250 to prevent further rotational deformation of the flow washer 250. In particular, as pressure increases beyond the second pressure, the flow washer 250 contacts the flow washer stops 342-347 such that the support wall 252 ceases to rotate inwardly around its inner rim 270, thereby preventing further decrease in the diameter of the orifice 163 due to rotational deformation. After the flow washer 250 contacts the flow washer stops 342-347, further pressure increases beyond the second pressure cause the flow washer 250 to radially compress. Specifically, fluid begins accumulating between the support wall 252 of the flow washer 250 and the wall 313 of the flow washer seat 310. As illustrated in FIG. 11C, the accumulation of fluid between the support wall 252 of the flow washer 250 and the wall 313 of the flow washer seat 310 radially compresses the support wall 252 of the flow washer 250, resulting in a decrease in the diameter of the orifice 263 that maintains fluid flow rate.

FIGS. 12-16C illustrate the flow regulator 400. The flow regulator 400 includes a flow washer 450 and a regulator body 500. The flow regulator 400 differs from the flow regulator 200 in that the flow regulator 400 is adjustable allowing the range of pressures where the flow regulator 400 maintains a desired flow rate to be manipulated. The flow regulator 400 inserts into the housing 801 and aligns with the fluid flow path 800 to maintain a desired flow rate within the fluid flow path 800 over a range of pressures.

FIGS. 12, 13 and 16A-16C illustrate the flow washer 450. The flow washer 450 is made from any suitable material that allows the flow washer 450 to be durable but also to deform under pressure, such as fluoroelastomers. Deformation under pressure allows the flow washer 450 to maintain a desired flow rate over a range of pressures and will be explained in greater detail herein.

The flow washer 450 includes a body 451 having a support wall 452 and a plate 453. The support wall 452 and the plate 453 form a cavity 455. The plate 453 includes a rim 456 surrounding a recessed surface 457. In the preferred embodiment, the support wall 452 is substantially cylindrical in shape and the plate 453 resides atop the support wall 452. The plate 453 includes an inlet 461, an outlet surface 466, and an outlet 462. The plate 453 further includes an orifice 463 of constant diameter extending through the plate 453. The inlet 461 allows fluid to enter the orifice 463 and the outlet 462 allows fluid to exit the orifice 463. Furthermore, the orifice 463 allows fluid striking the plate 453 to pass therethrough and into the cavity 455. In particular, fluid striking the plate 453 causes pressure to build on the recessed surface 457. This pressure in turn forces the fluid into the inlet 461 and through the orifice 463. After passing through the orifice 463, fluid exits the outlet 462 and enters the cavity 455.

In the preferred embodiment, the flow washer 450 and the flow washer 250 include different shapes to accommodate fluids of varying viscosity. For example, flow washer 250 is designed to operate with less viscous fluids such as water, whereas flow washer 450 is designed to operate with more viscous fluids such as beverage syrup. It should be understood that the flow regulators 200 and 400 may incorporate either the flow washer 250 or the flow washer 450 depending upon the viscosity of the fluid flowing therethrough.

Figure 14:
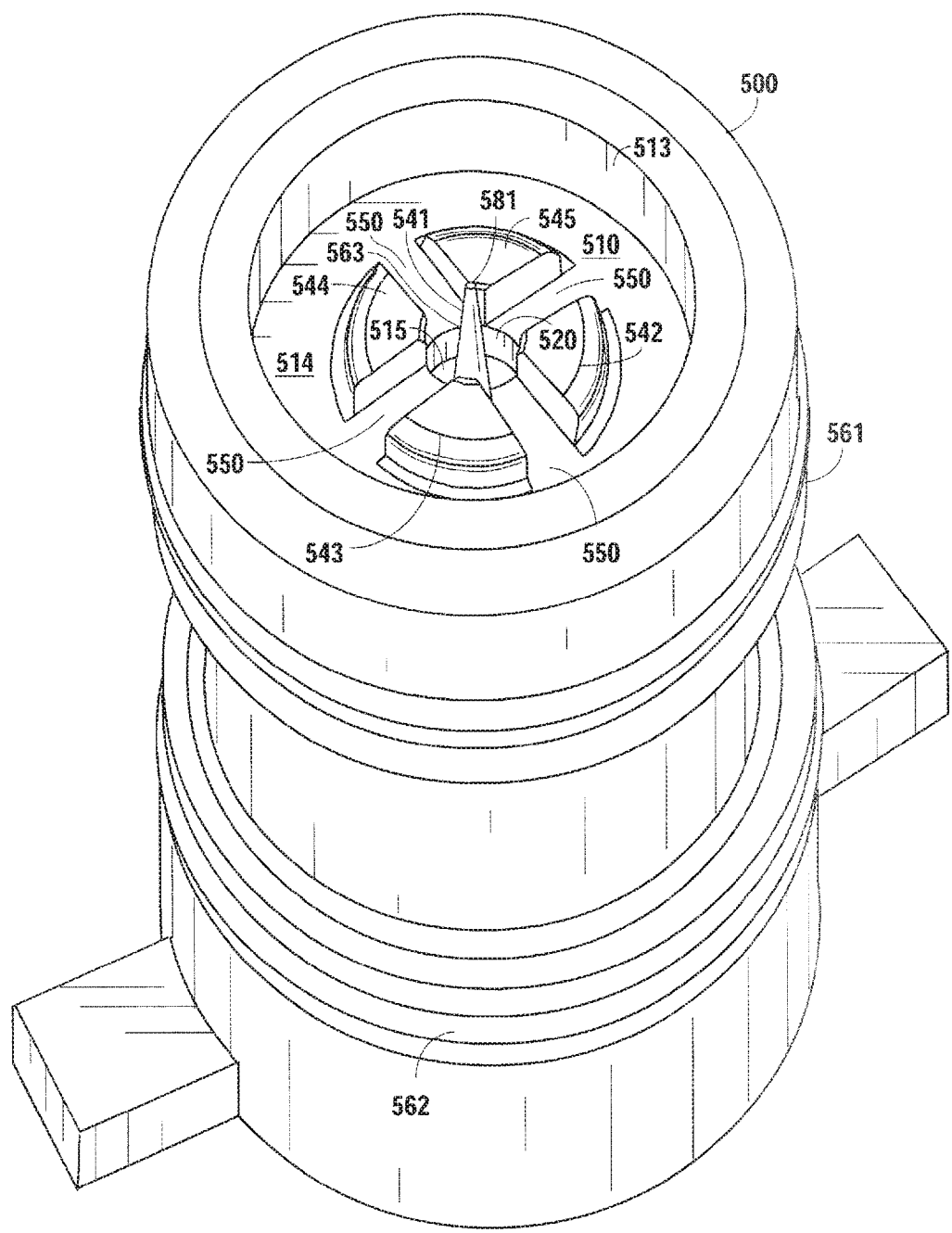
FIG. 14 is a perspective view illustrating a regulator body of the adjustable flow regulator.
Figure 15:
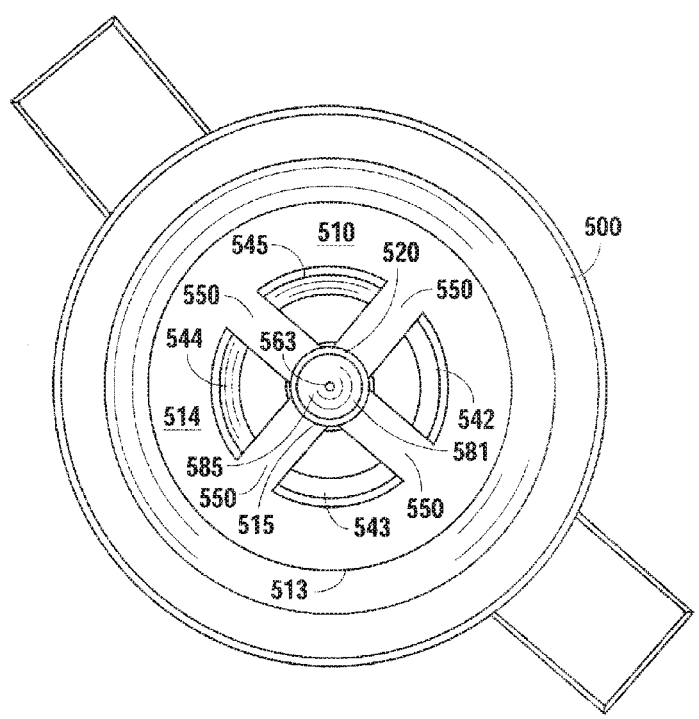
FIG. 15 is a top view illustrating the regulator body of the adjustable flow regulator.
Figure 16B:
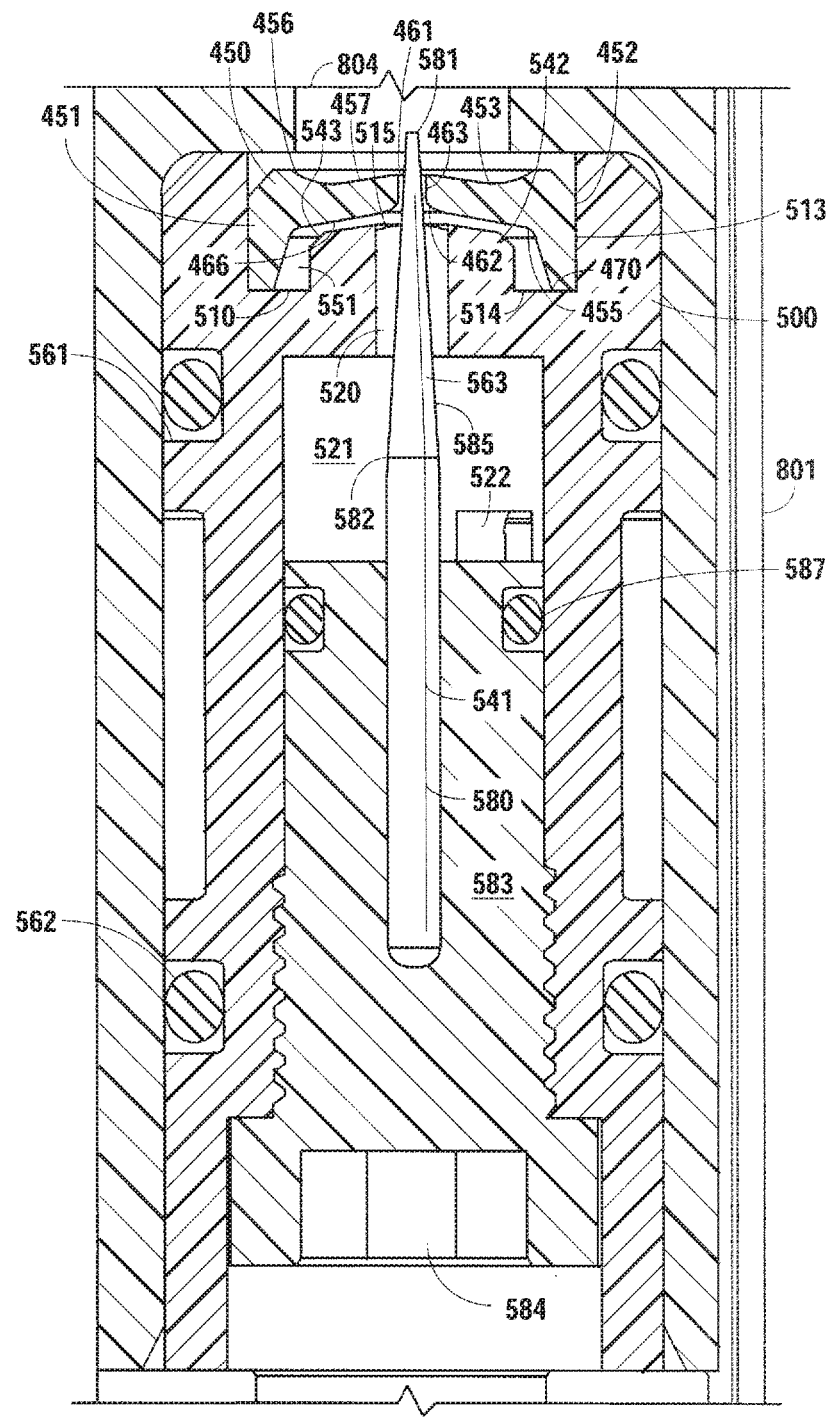
Figure 16B:
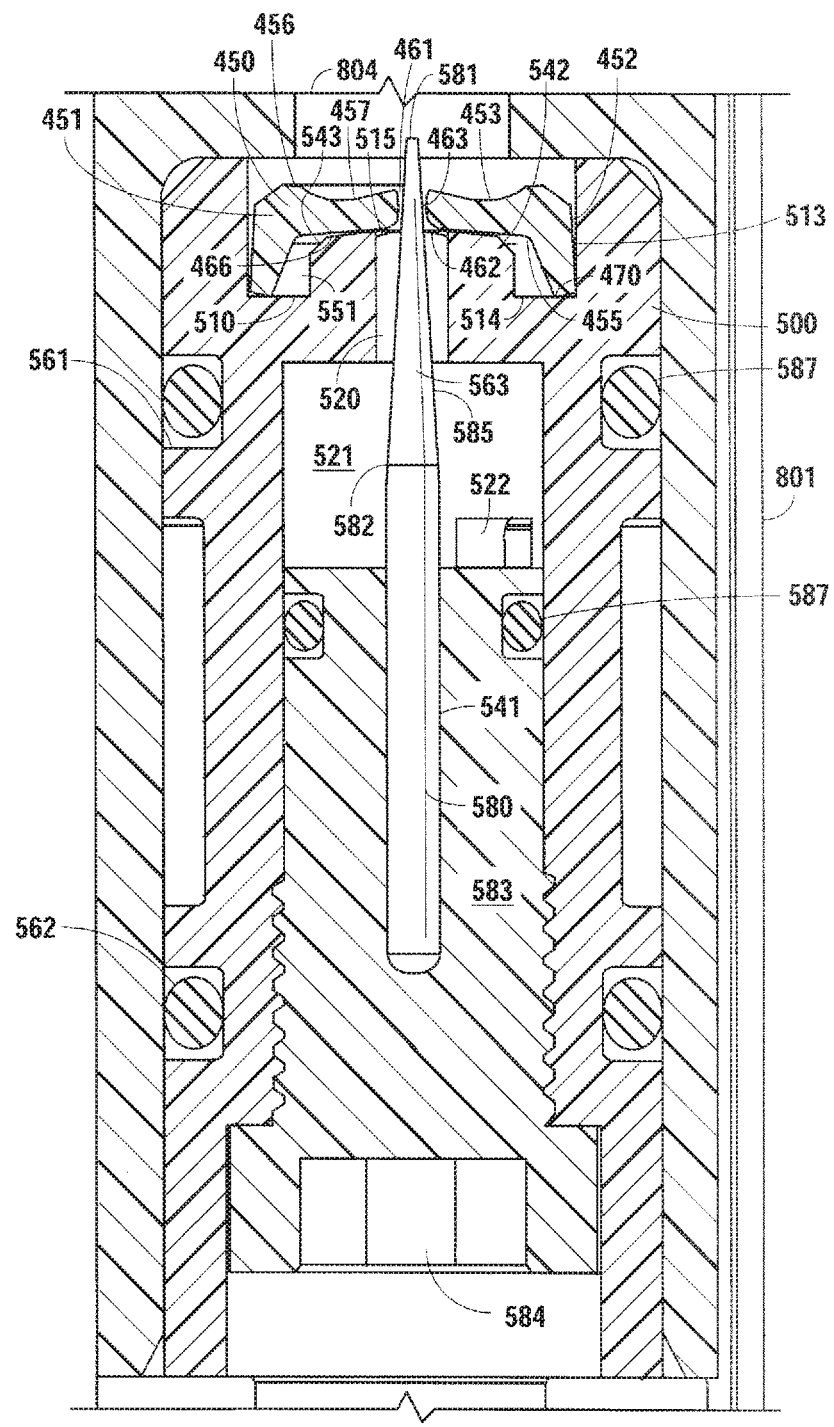

FIGS. 14-16 illustrate the regulator body 500. The regulator body 500 includes a flow washer seat 510, a conduit 520, a fluid chamber 521, a passage 522, a diffuser assembly 541, and grooves 561 and 562 for receiving O-rings therein. The flow washer seat 510 receives the flow washer 450 and includes a wall 513, a flow washer-receiving surface 514, a fluid conduit inlet 515, and flow washer stops 542-545. The flow washer stops 542-545 engage the flow washer 450 to prevent further deformation of the flow washer 450 after a second pressure is reached. The operation of the flow washer stops 542-545 will be explained in greater detail herein.

The diffuser assembly 541 resides inside the fluid chamber 521 and includes a diffuser 563, abase 583, and a groove 587 for receiving an o-ring. The diffuser 563 includes a shaft 580 and a tip 585. The tip 585 includes a first end 581 and a second end 582, wherein the cross-sectional area of the tip 585 gradually increases from the first end 581 to the second end 582. Furthermore, the shaft 580 of the diffuser 563 inserts and secures within the base 583. The base 583 includes threads that mate with a threaded surface on the interior of the regulator body 500 thereby allowing the diffuser assembly 560 to install within the fluid chamber 521. Once the diffuser assembly 541 installs within the fluid chamber 521, a portion of the diffuser 563 resides within a central portion of the conduit 520 and the orifice 463 of the flow washer 450.

The base 583 allows the first end 581 of the tip 585 to extend or retract into the orifice 463 of the flow washer 450, in particular, by rotating the base 583 via an engaging surface 584 a user can extend or retract the first end 581 of the tip 585 into the orifice 463 of the flow washer 450. Extending or retracting the first end 581 of the tip 585 into the orifice 463 of the flow washer 450 allows the flow regulator 400 to adjust the range of pressures where the flow regulator 400 will maintain a desired flow rate and will be explained in greater detail herein.

The flow regulator 400 is assembled in the following manner. O-rings insert within the grooves 561 and 562 to provide a seal between the flow regulator 400 and the housing 801. The shaft 580 of the diffuser 563 inserts and secures within the base 583. An o-ring inserts within the grooves 587 to provide a seal between the diffuser assembly 541 and the fluid chamber 521. The threads of the base 583 mate with the threaded surface in the interior of the regulator body 500 thereby installing the diffuser assembly 541 within the fluid chamber 521. The flow washer 450 aligns with the flow washer seat 510 such that the orifice 463 of the flow washer 450 resides above the diffuser 563. The flow washer 450 installs within the flow washer seat 510 such that its support wall 452 abuts the wall 513 and the flow washer-receiving surface 514. Furthermore, the first end 581 of the diffuser 541 resides within the orifice 463. Once the flow washer 450 installs within the flow washer seat 510, the support wall 452 of the flow washer 450 surrounds the flow washer stops 542-545 of the flow washer seat 510. As a result of surrounding the washer stops 542-545 of the flow washer seat 510, the flow washer 450 and the washer stops 542-545 create a circumferential channel 551 communicating with pathways 550. Furthermore, the outlet surface 466 of the flow washer 450, the diffuser assembly 541, and the washer stops 542-545 form a delivery path that transports fluid to and from the circumferential channel 551 via the pathways 550.

After assembly, the flow regulator 400 inserts within the housing 801 such that the flow regulator 400 aligns with the fluid flow path 800. Specifically, the flow regulator 400 inserts within the housing 801 such that the flow washer seat 510 with the flow washer 450 installed, aligns with inlet 804 leading from the fluid source 802. Furthermore, the passageway 522 of the flow regulator 400 aligns with the outlet 805. Once inserted into the housing 801, the flow regulator 400 transports fluid from the inlet 804 to the outlet 805.

The flow regulator 400 operates in the following manner to transport fluid from the syrup inlet 804 to the outlet 805. Fluid exits the fluid source 802 and begins flowing through the fluid line 803. Fluid enters the inlet 804 of the housing 801 where the fluid contacts the flow washer 450. Upon contacting the flow washer 450, fluid strikes the plate 453 of the flow washer 450 resulting in fluid pressure beginning to build on the recessed surface 457. As pressure begins to build on the recessed surface 457, fluid is forced into the inlet 461 and through the orifice 463 of the flow washer 450. After passing through the orifice 463, fluid exits the outlet 465 and enters the cavity 455 of the flow washer 450. The fluid entering the cavity 455 flows through the pathways 550 and into the circumferential channel 551. The fluid fills the circumferential channel 551, thereby equalizing the fluid pressure within the cavity 445 of the flow washer 450. This equalization of fluid pressure stabilizes the flow of fluid through the flow washer 450 and prevents vibration of the flow washer 450 within the flow washer seat 510. In addition, fluid flowing though the orifice 463 contacts the diffuser 563 and moves from the first end 581 to the second end 582 of the tip 585. The tip 585 of the diffuser 563 disperses the fluid through the fluid conduit inlet 515 and into the conduit 520. From the conduit 520, the fluid is transported to and collected in the fluid chamber 521. The fluid exits the fluid chamber 521 through the passageway 522 for conveyance to the outlet 805. The fluid exits the outlet 805 of the housing 801 and is transported by the fluid line 806 to the end source 807. In addition, the diffuser 563 disperses excess fluid into the pathways 550. From the pathways, the fluid is transported to and collected in the circumferential channel 551. The fluid fills the circumferential channel 551, thereby equalizing the fluid pressure within the cavity 445 of the flow washer 450. This equalization of fluid pressure stabilizes the flow of fluid through the flow washer 450 and prevents vibration of the flow washer 450 within the flow washer seat 510. Furthermore, fluid collected in the delivery circumferential channel 551 travels from the circumferential channel 551 via the pathways 550 and enters the fluid conduit inlet 515 for conveyance to the outlet 805 via the conduit 520.

In addition to transporting fluid from the inlet 804 to the outlet 805 of the housing 801, the flow regulator 400 also regulates the fluid flow rate over a range of pressures. Regulation of the fluid flow rate begins when fluid pressure caused by the fluid striking the inlet surface 460 of the flow washer 450 reaches an initial first pressure. The flow regulator 400 continues to regulate the fluid flow rate even after a second pressure normally associated with flow washers is reached.

Once fluid pressure caused by the fluid striking the inlet surface 460 of the flow washer 450 increases to a point where the initial first pressure is reached, the flow washer 450 rotationally deforms to maintain a desired flow rate between the initial first pressure and the second pressure. Specifically, between the initial first pressure and the second pressure, the support wall 452 rotates around an inner rim 470 to increase or decrease the diameter of the orifice 463 to maintain the desired flow rate. Pressure increases beyond the initial threshold first pressure causes the support wall 452 to rotate inwardly around the inner rim 470 of the support wall 452 until the second pressure is reached. As illustrated in FIG. 16B, the inward rotation of the support wall 452 deforms the flow washer 450 such that the orifice 463 decreases in diameter. Conversely, decreases in pressure between the second pressure and the initial first pressure causes the support wall 452 to rotate outwardly around the inner rim 470 of the support wall 452 until the initial first pressure is reached. The outward rotation of the support wall 452 deforms the flow washer 450 such that the orifice 463 increases in diameter.

Figure 16C:
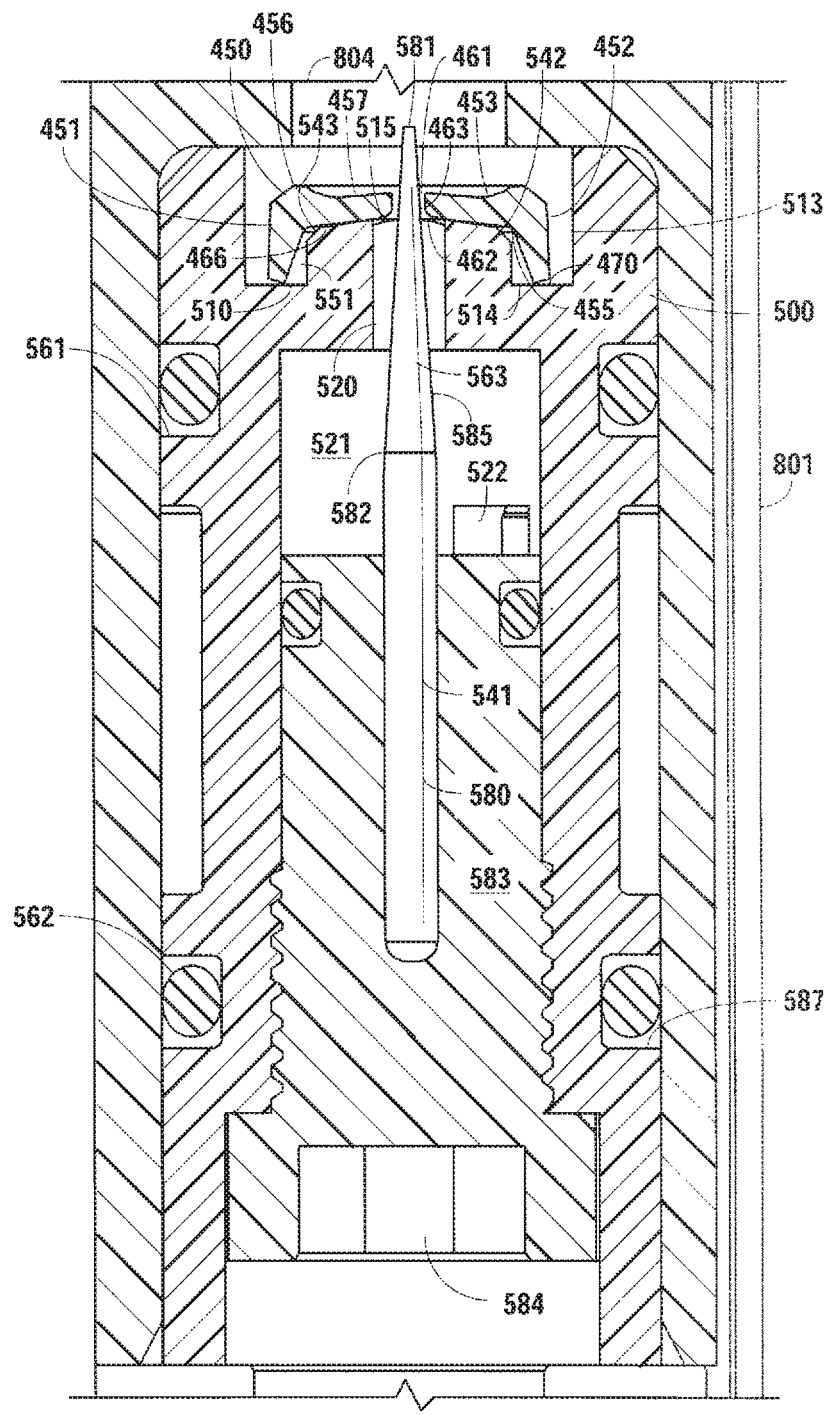

Once pressure increases beyond the second pressure the flow washer 450 in combination with the flow washer stops 542-545 allows the flow washer 450 to continue to maintain the desired flow rate. After the second pressure is reached, the flow washer stops 542-545 engage the flow washer 450 to prevent further rotational deformation of the flow washer 450. In particular, as pressure increases beyond the second pressure, the flow washer 450 contacts the flow washer stops 542-545 such that the support wall 452 ceases to rotate inwardly around its inner rim 470. After the flow washer 450 contacts the flow washer stops 542-547 further pressure increases beyond the second pressure cause the flow washer 450 to radially compress. As illustrated in FIG. 16C, the accumulation of fluid between the support wall 452 of the flow washer 450 and the wall 513 of the flow washer seat 510 radially compresses the support wall 452 of the flow washer 450, resulting in a decrease in the diameter of the orifice 463 that maintains fluid flow rate.

In addition to the above stated features, the flow regulator 400 is adjustable to allow an operator to set the flow rate of a fluid flowing therethrough. Specifically, extending or retracting the first end 581 of the diffuser 563 into the orifice 463 of the flow washer 450 changes fluid flow rate. In particular, extending the diffuser 563 into the orifice 463 occludes the orifice 463 thereby creating a lower flow rate. Conversely, retracting the diffuser 563 from the orifice 463 dilates the orifice 463 thereby creating a higher flow rate. The adjustability of the flow regulator 400 allows synchronization of flow rates between the adjustable flow regulator 400 and the flow regulator 200. Specifically, an operator can adjust the flow rate of fluid through the flow regulator 400 such that the fluid flow rates of the flow regulators 200 and 400 are maintained at a desired ratio, which will be described in greater detail herein.

Figure 1:
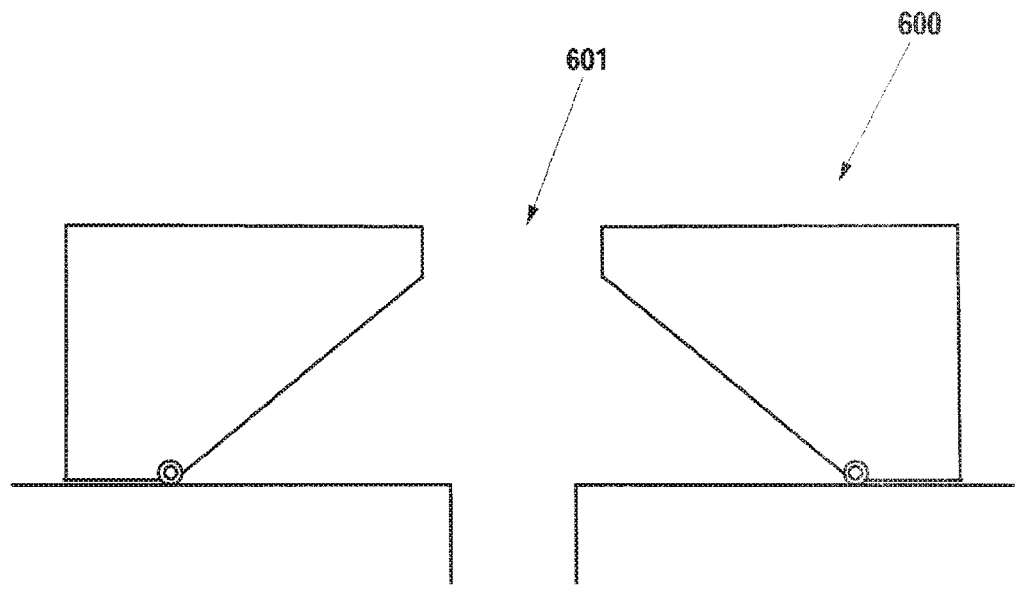
FIG. 1 is a diagram illustrating a flow washer according to the prior art.
Figure 2:
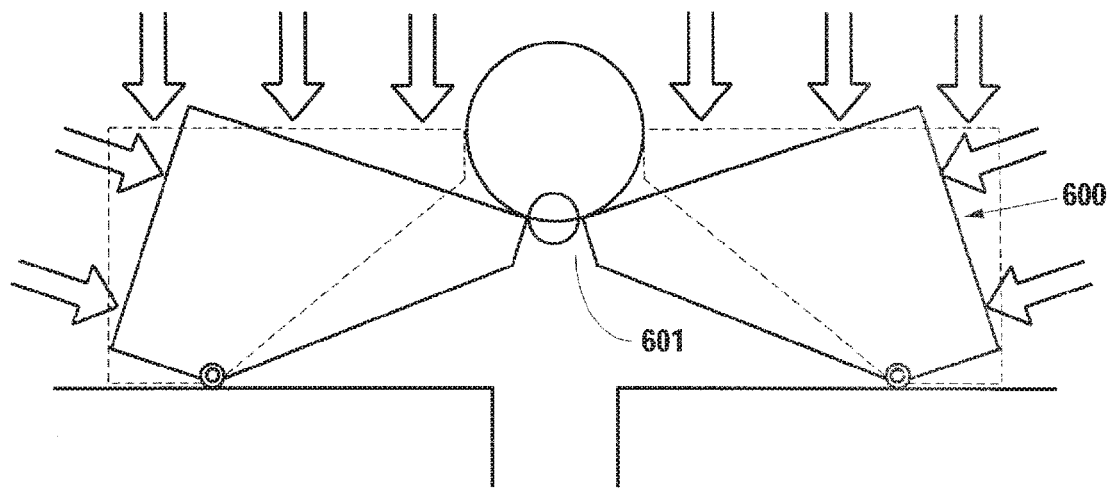
FIG. 2 is a diagram illustrating the deformation of the flow washer according to the prior art.
Figure 3:
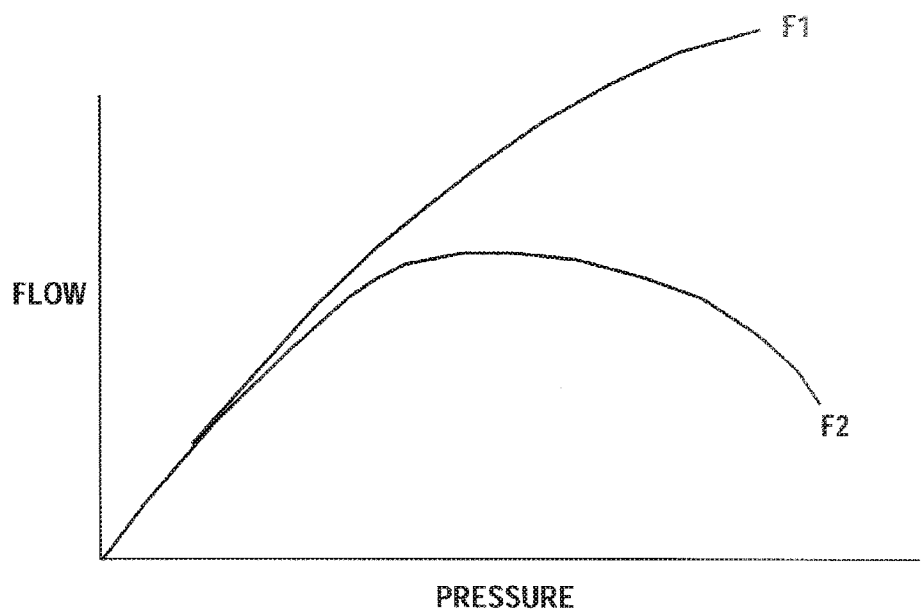
FIG. 3 is a graph illustrating the flow characteristics of the flow washer according to the prior art.
Figure 17:
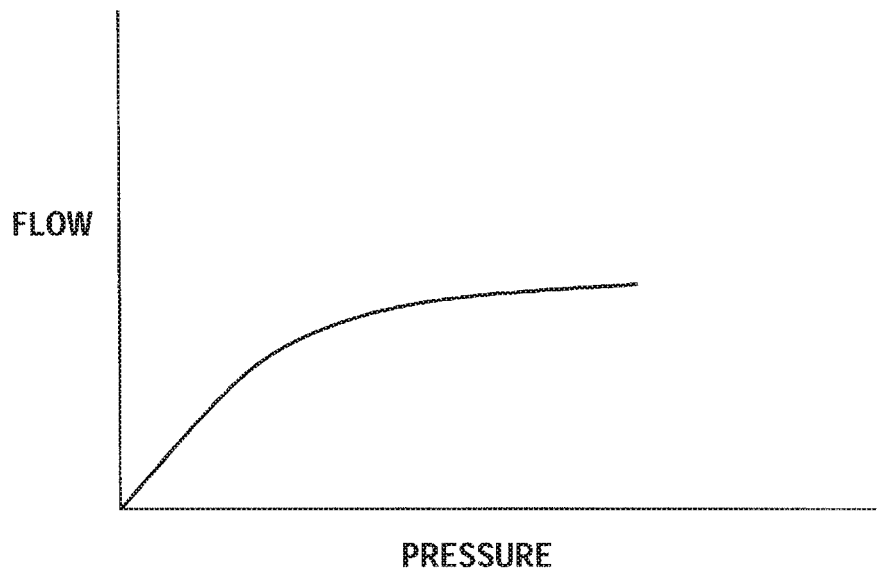
FIG. 17 is a graph illustrating the flow characteristics produced when a flow washer of the present invention is not used in conjunction with a regulator body of the present invention.
Figure 18:
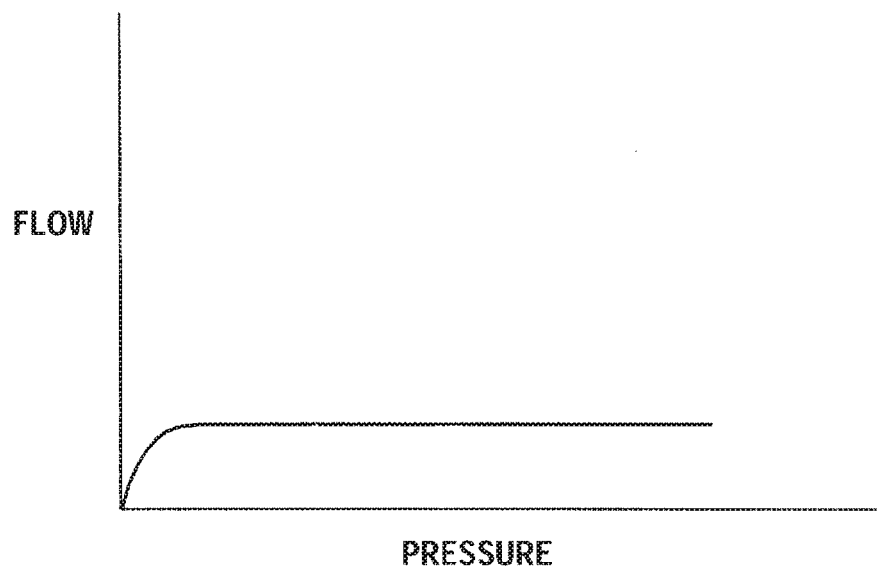
FIG. 18 is a graph illustrating the flow characteristics achieved when a flow washer of the present invention is used in conjunction with a regulator body of the present invention.
Figure 19:
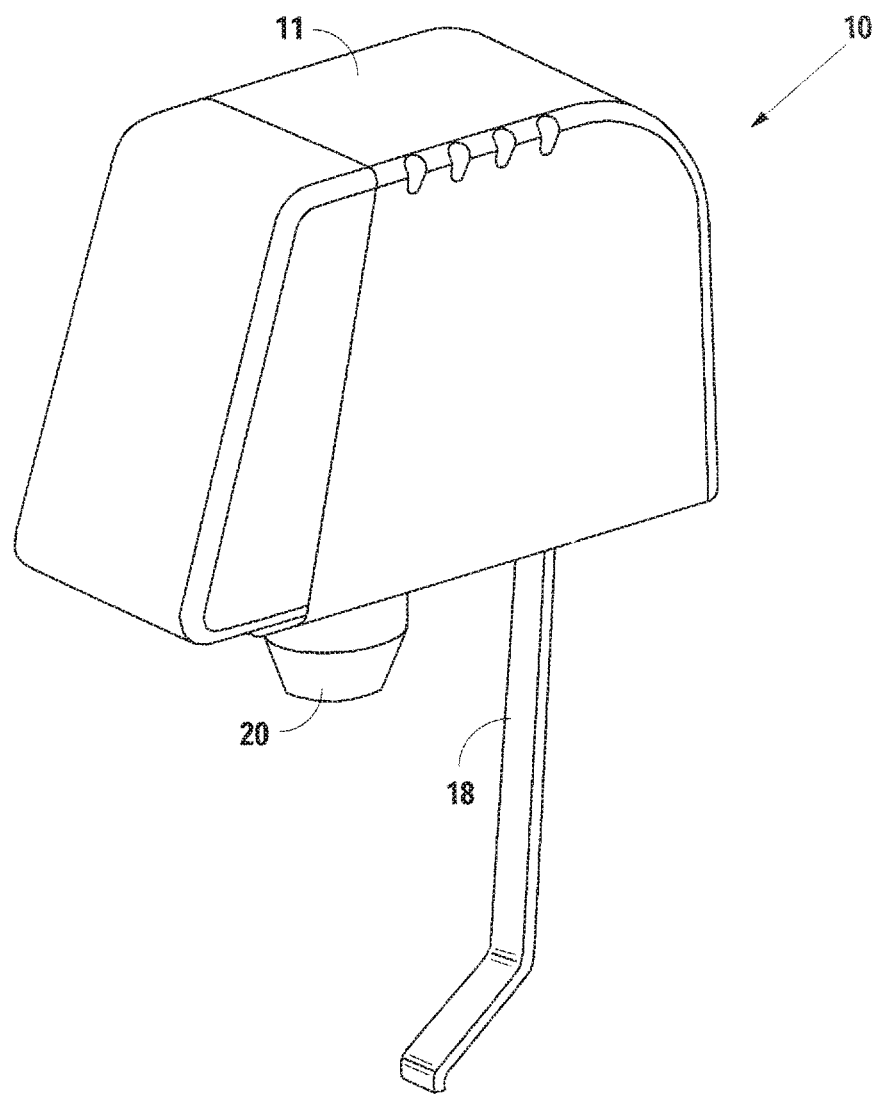
FIGS. 19 and 20 are perspective views illustrating a beverage dispenser valve sub-assembly.
Figure 20:
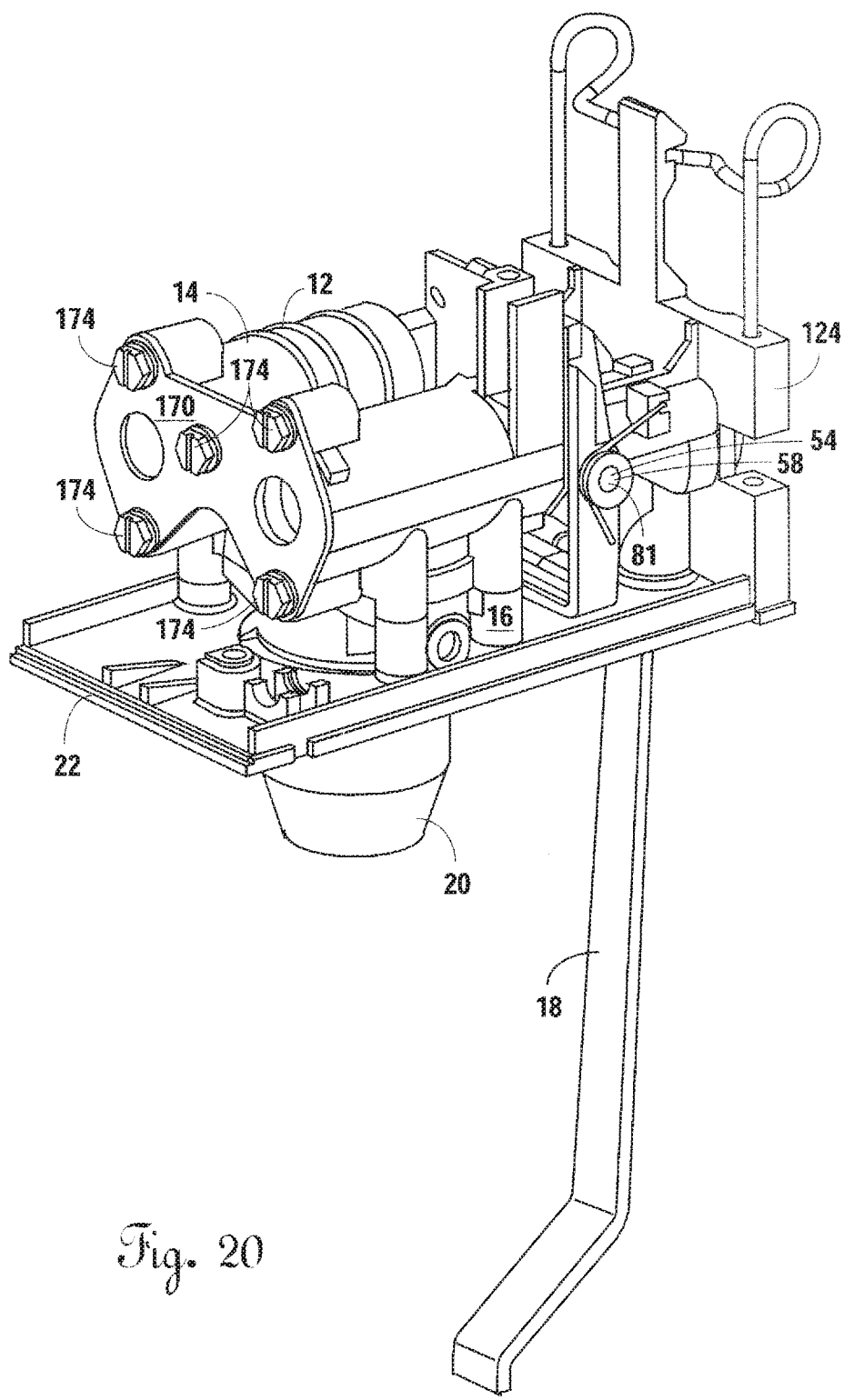
Figure 21:
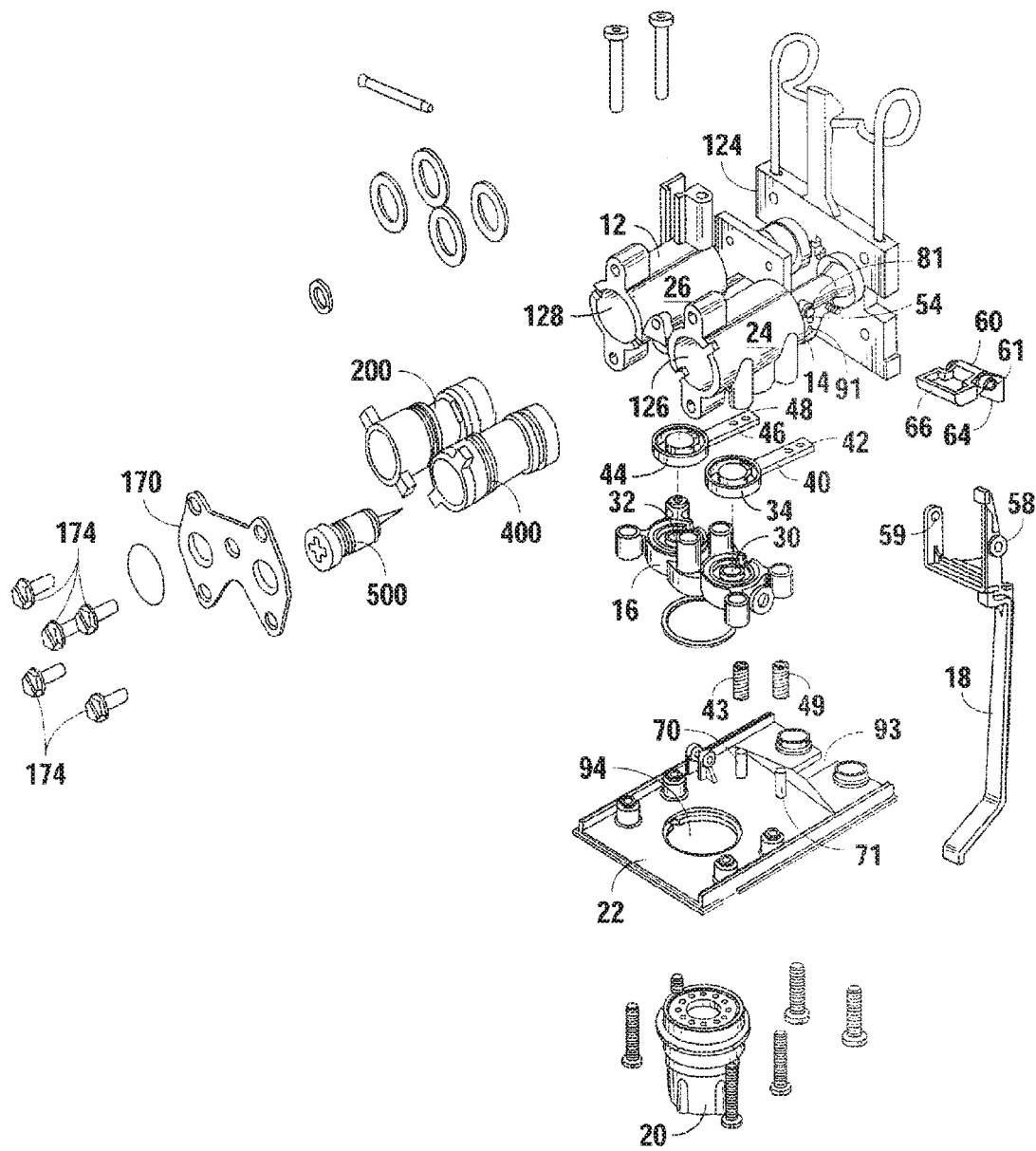
FIG. 21 is an exploded view illustrating the beverage dispenser valve sub-assembly.
Figure 22:
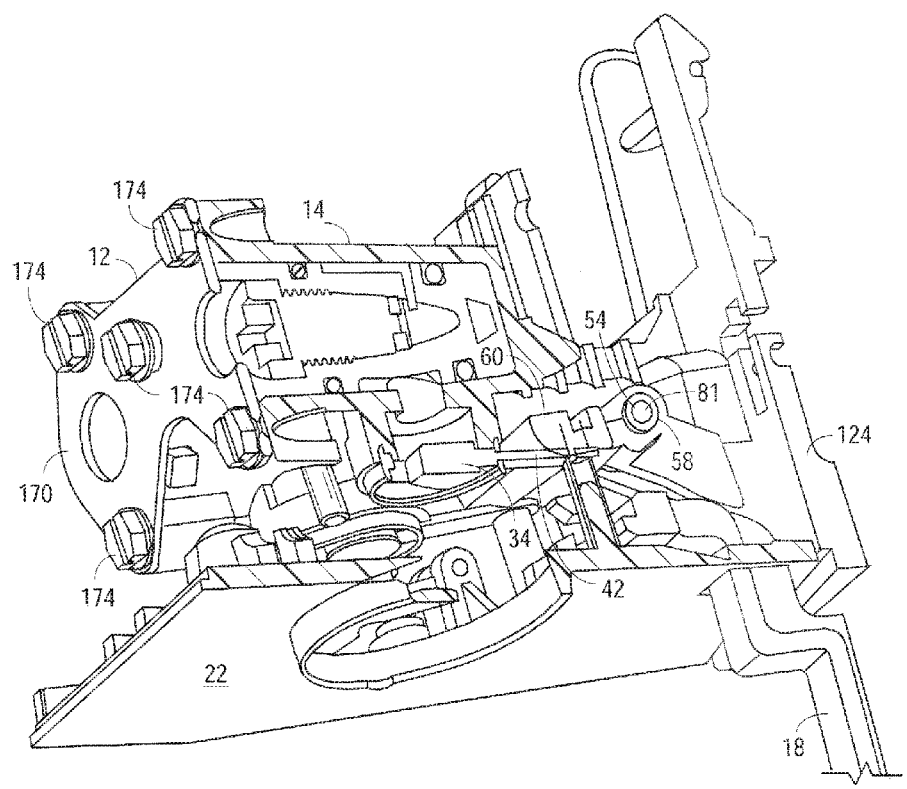
FIG. 22 is a cross-sectional view taken along a right side of the beverage dispenser valve sub-assembly illustrating an upper valve body of the beverage dispenser valve sub-assembly.
Figure 23:
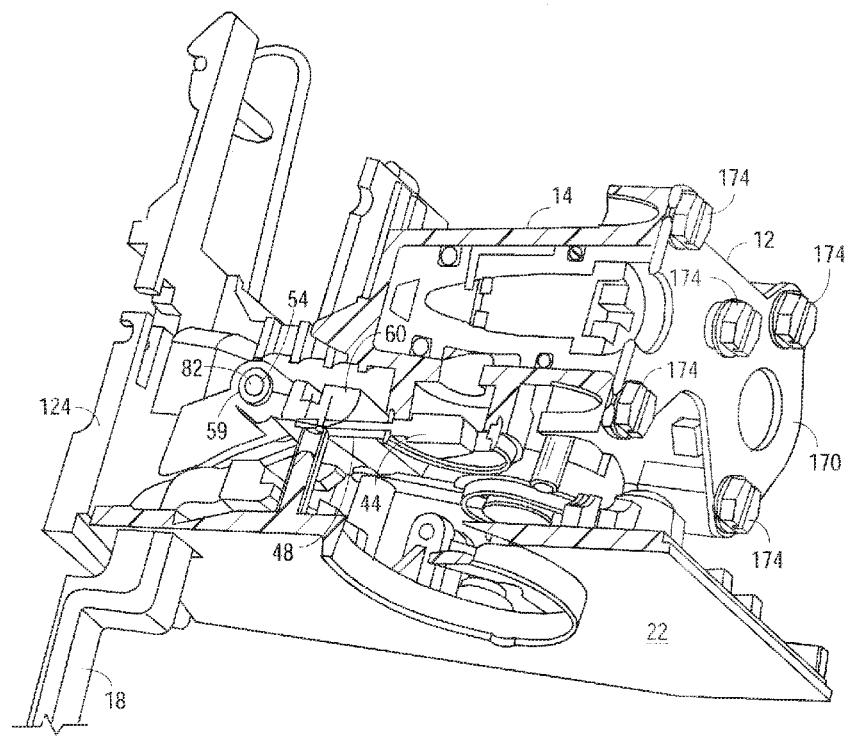
FIG. 23 is a cross-sectional view taken along a left side of the beverage dispenser valve sub-assembly illustrating the upper valve body of the beverage dispenser valve sub-assembly.

The present embodiment of the flow regulator 200 and the flow regulator 400 improve upon existing flow controllers. As shown in FIGS. 1 and 2, existing flow washers are block shaped in that the support wall and the plate of the flow washer connects at an inner rim of the support wall and at the orifice of the flow washer. Existing flow washers control flow by allowing rotation about the inner rim of the flow washer. In particular, altering the stiffness of the support wall controls flow. However, this existing shape of flow washers makes controlling flow over a range of pressures difficult. Specifically, if the support wall is too stiff the flow curve will rise outside the desired range (shown in F1). Conversely, if the support wall is too flexible, the flow curve will fall dramatically once an outer pressure limit is attained (shown in F2). In the present embodiment, the shapes of the flow washer 250 and the flow washer 450 are altered to allow rotation and radial compression. Specifically, as illustrated in FIG. 11A, material is removed from the support wall 252 and the plate 253 reducing the circumferential thickness of the body 251 of the flow washer 250. Likewise, as illustrated in FIG. 16A material is removed from the support wall 452 and the plate 453 reducing the circumferential thickness of the body 451 of the flow washer 450. By reducing the circumferential thickness of the bodies 251 and 451 the flow washer 250 and 450, respectively, the flow washer 250 and 450 rotate more easily and allow radial compression as illustrated in FIGS. 11C and 16C. However, combining rotation and radial compression would result in too much deformation producing a flow vs. pressure curve as illustrated in FIG. 3. As illustrated in FIG. 11B, to prevent over deformation, the flow washer 250 when combined with the flow washer stops 342-347 of the regulator body 300 prevents over rotation of the flow washer 250 thereby allowing the radial compression of the flow washer 250. Likewise, as illustrated in FIG. 16B the flow washer 450 when combined with the flow washer stops 542-545 of the regulator body 500 prevents over rotation of the flow washer 450 thereby allowing the radial compression the flow washer 450. If only rotation occurred, the flow vs. pressure curve illustrated in FIG. 17 would be produced. Because the flow washer 250 and the flow washer 450 combine rotation and radial compression with the flow washer stops 342-347 and the flow washer stops 542-545, respectively, the flow vs. pressure curve illustrated in FIG. 18 is substantially, completely produced.

The modular flow regulator system 1 can be used in any system where flow rate needs to be regulated over a range of pressures. For the sake of example and to aid in understanding of the modular flow regulator system 1, the modular flow regulator system 1 may be incorporated within a beverage dispenser valve sub-assembly 10 illustrated in FIGS. 19-24. In the preferred embodiment, the beverage dispenser valve sub-assembly 10 is set up for mechanical operation using a manual valve assembly, however, those of ordinary skill in the art will recognize that the beverage dispenser valve sub-assembly 10 may be set up for electrical operation using an electrical valve assembly. When inserted within beverage dispenser valve sub-assembly 10, the flow regulator 200 maintains a desired flow rate within a diluent flow path and the adjustable flow regulator 400 maintains a desired flow rate within a syrup flow path. In addition, when inserted within beverage dispenser valve sub-assembly 10, the flow regulator 200 and the flow regulator 400 of the flow regulator system 1 "synchronize" their flow rates to maintain a proper syrup to water ratio, thereby making a proper tasting beverage.

The beverage dispenser valve sub-assembly 10 includes a cover 11, a valve body 12 further including an upper valve body 14 and a lower valve body 16, a cup lever arm 18, a nozzle 20, a lower housing plate 22, a syrup valve 34, a diluent valve 44, a valve actuator 60, and a vertical mounting plate 124 formed integrally with the upper valve body 14.

The upper valve body 14 includes a syrup conduit 24 and a diluent conduit 26 therethrough. The syrup conduit 24 extends from a syrup inlet port in the vertical mounting plate 124 through an aperture 30 in the lower valve body 16 and to the nozzle 20. The syrup conduit 24 includes a flow regulator chamber 126 for receiving the flow regulator 400 therein. The diluent conduit 26 extends from a diluent inlet port in the vertical mounting plate 124 through a diluent aperture 32 in the lower valve body 16 and to the nozzle 20. The diluent conduit 26 includes a flow regulator chamber 128 for receiving the flow regulator 200 therein. After the flow regulator 400 and the flow regulator 200 have been positioned in their respective chambers 126 and 128, a retainer 170 is attached to the upper valve body 14 by screws 174.

The lower valve body 16 includes the diluent aperture 32 and the syrup aperture 30. The diluent aperture 32 receives diluent from the flow regulator 200. After receiving the diluent, the diluent flows through a diluent passageway and into the nozzle 20. The syrup aperture 30 receives syrup from the flow regulator 400. After receiving the syrup, the syrup flows through a syrup passageway and into the nozzle 20.

The syrup valve 34, preferably a paddle valve, seats in a syrup valve chamber 36 formed by an upper portion of the lower valve body 16 and a lower portion of the upper valve body 14. The syrup valve 34 controls the on and off flow of syrup through the syrup conduit 24. The syrup valve 34 contacts a syrup valve seat 38 and includes an actuating lever arm 40 further including a distal end 42 that extends outside of the lower valve body 16 and connects a biasing member 43 secured to the lower plate sing any suitable means such as a post 70. The biasing member 43 biases the syrup valve 34 into a normally closed position.

The diluent valve 44, preferably a paddle valve, seats in a diluent chamber 46 formed between an upper portion of the lower valve body 16 and a lower portion of the upper valve body 14. The diluent valve 44 controls the on and off flow of diluent through the diluent conduit 26. The diluent value 44 contacts a diluent valve seat 39 and includes an actuating lever arm 46 further including a distal end 48 that extends outside of the lower valve body 16 and connects to a biasing member 49 secured to the lower plate 22 using any suitable means such as a post 71. The biasing member 49 biases the syrup valve 34 into a normally closed position.

The cup lever arm 18 secures to pins 81 and 82 located in the upper valve body 14. In particular, the cup lever arm 18 includes apertures 58 and 59 that insert over the pins 81 and 82. The pins 81 and 82 allow the cup lever arm 18 to pivot about a pivot axis 54. Furthermore, a biasing member 56 secures to the cup lever arm 18 and the valve body 12. The cup lever arm 18 has a rest position and an actuated position, wherein the biasing member 56 biases the cup lever arm 18 into the rest position. In the actuated position, the cup lever arm 18 operates the valve actuator 60 to simultaneous open the syrup and diluent valves 34 and 44, respectively, causing a beverage to be dispensed from the nozzle 20.

The valve actuator 60 includes a hinge 61 that secures to the upper valve body 14 using a pin 83 that engages apertures 91 in the upper valve body 14. Once secured to the upper valve body 14, the pin 83 allows the valve actuator 60 to pivot about a pivot point 67. The valve actuator 60 includes a cup lever interface 64 and a paddle valve interface 66. The cup lever interface 64 engages the cup lever 18 and the paddle valve interface 66 engages the distal ends 42 and 48 of the syrup valve 34 and the diluent valve 44 respectively. Furthermore, the valve actuator 60 moves between a valve activation position and a valve release position.

The lower housing plate 22 provides an attachment point for the upper valve body 14 and the lower valve body 16. The lower housing plate 22 includes an aperture 93 for receiving the cup lever arm 18, an aperture 94 for receiving the nozzle 20, posts 70 and 71 that receive and secure the biasing members 43 and 49, and apertures 95-100 for receiving screws. Screws placed through the apertures 95-100 in the lower plate 22 secure the upper valve body 14 and the lower valve body 16 to each other as well to the lower housing plate 22.

The nozzle 20 incorporates with the beverage dispenser valve sub-assembly 10 to deliver syrup from the syrup conduit 24 and diluent from the diluent conduit 26. After receiving the syrup and diluent, the nozzle 20 combines the syrup (product) and the diluent to produce a dispensed drink. The nozzle 20 defines a mixing chamber surrounding a diffuser as is well-known in this art. The diffuser frictionally engages the lower valve body 16, and the nozzle 20 fits into the aperture 94 of the lower housing plate 22 and frictionally engages the lower housing plate 22.

The beverage dispenser valve sub-assembly 10 assembles in the following manner. The flow regulator 400 and the flow regulator 200 are placed in their respective chambers 126 and 128. The retainer 170 is attached to the upper valve body 14 by screws 174 thereby securing the adjustable flow regulator 400 and the flow regulator 200 within the upper valve body 14. The hinge 61 of the valve actuator 60 aligns with the apertures 91 and 92 in the upper valve body 14. The pin 83 is placed through the apertures 91 and 92 and the hinge 61 respectively thus securing the valve actuator 60 with the upper valve body 14. The apertures 58 and 59 of the cup lever arm 18 insert over the pins 81 and 82 of the upper valve body 14. The biasing member 56 secures to the cup lever arm 18 and the valve body 12. Once secured to the cup lever arm 18 and the valve body 12, the biasing member 56 biases the cup lever arm 18 into the rest position.

The syrup valve 34 and the diluent valve 46 are seated respectively in the syrup valve seat 38 and the diluent valve seat 39. The upper valve body 14 is placed over the lower valve body 16 and into an abutting relationship therewith thereby forming the syrup valve chamber 36 and the diluent chamber 46. Furthermore, placing the upper valve body 14 over the lower valve body 16 results in the paddle valve interface 66 of the valve actuator 60 engaging the distal ends 42 and 48 of the syrup valve 34 and the diluent valve 44 respectively.

The biasing members 43 and 49 insert respectively over the posts 70 and 71 of the lower housing plate 22. Once the biasing members 43 and 49 are in place, the aperture 94 of the lower housing plate 22 aligns with the passageways 31 and 33 of the lower valve body 16 and the aperture 93 of the lower housing plate 22 aligns with the cup lever arm 18. A portion of the cup lever arm 18 is placed through the aperture 93 of the lower plate 22 and screws are inserted into apertures 95-100 thereby securing the upper valve body 14 and lower valve body 16 to each other and to the lower housing plate 22. Upon securing the upper valve body 14 and lower valve body 16 to the lower housing plate 22, the distal ends 42 and 48 of the syrup and diluent valves 34 and 46 contact a respective biasing member 43 and 49. The biasing members 43 and 49 bias the syrup valve 34 and the diluent valve 46 into the normally closed position. Furthermore, the biasing members 43 and 49 impart a force into the distal ends 42 and 48 of the syrup and diluent valves 34 and 46. The imparted force causes the distal ends 42 and 48 of the syrup and diluent valves 34 and 46 to engage the paddle valve interface 66 of the valve actuator 60 such that the valve actuator 60 pivots about its pivot point 67 and moves to its valve release position.

In operation, the cup lever arm 18 engages the valve actuator 60 to open the paddle valves 34 and 44. Specifically, when the bottom end of the cup lever arm 18 is pushed back by a hand-held cup (not shown), the cup lever arm 18 moves from the rest position to the actuated position. In moving from the rest position to the actuated position, the cup lever arm 18 pivots about the pivot axis 54 to engage the cup lever interface 64 of the valve actuator 60 and pivot the valve actuator 60 about its pivot point 67 such that the valve actuator 60 moves from its valve release position to its valve activation position.

The movement of the valve actuator 60 into its valve activation position results in the paddle valve interface 66 of the valve actuator 60 manipulating the distal ends 42 and 48 of the syrup and diluent valves 34 and 44 thereby opening the syrup valve 34 and the diluent valve 44. Specifically, the paddle valve interface 66 of the valve actuator 60 pivots to overcome the biasing force of the respective biasing members 43 and 49 of the syrup and diluent valves 34 and 44. Once the biasing force of the biasing members 43 and 49 is overcome, the valve actuator 60 causes the distal ends 42 and 48 of the two paddle valve arms 40 and 46 to snap downwardly to quickly, fully, and simultaneously open the syrup and diluent valves 34 and 44. Diluent and syrup then flow through the apertures 30 and 32, respectively, to the nozzle 20 where they are mixed together and discharged into the cup.

When the cup lever arm 18 is released, the biasing member 56 and the biasing members 43 and 49 work in tandem to close the syrup and diluent valves 34 and 44, move the valve actuator 60 to its valve release position, and return the cup lever arm 18 to its rest position. Specifically, when the bottom end of the cup lever arm 18 is released, the biasing member 56 acts upon the cup lever arm 18 and biases the cup lever arm 18 from its actuated position to its rest position. Furthermore, the cup lever 18 pivots about the pivot axis 54 to disengage from the cup lever interface 64 of the valve actuator 60 thereby allowing the valve actuator 60 to move from its valve activation position to its valve release position. In particular, the disengagement of the cup lever arm 18 from the cup lever interface 64 removes the force compressing the biasing members 43 and 49, resulting in the biasing members 43 and 49 biasing the distal ends 42 and 48 of the two paddle valve arms 40 and 46 such that they snap upwardly thereby quickly, fully, and simultaneously returning the syrup and diluent valves 34 and 44 to their normally closed position. Once the syrup and diluent valves 34 and 44 have returned to their normally closed position, diluent and syrup stop flowing through the apertures 30 and 32 respectively and to the nozzle 20.

In addition to returning the syrup and diluent valves 34 and 44 to their normally closed position, the biasing force of the biasing members 43 and 49 causes the distal ends 42 and 48 of the paddle valve arms 40 and 46 to manipulate the paddle valve interface 66 of the valve actuator 60. Specifically, the biasing members 43 and 49 impart a force into the distal ends 42 and 48 of the syrup and diluent valves 34 and 46. The force imparted into the distal ends 42 and 48 of the syrup and diluent valves 34 and 46 causes the distal ends 42 and 48 of the syrup and diluent valves 34 and 46 to engage paddle valve interface 66 of the valve actuator 60 such that the valve actuator 60 pivots about its pivot point 67 and moves to its valve release position.

In the beverage industry, most drinks require a specific diluent to syrup ratio to create a proper tasting beverage. For example, sodas typically require 5 parts carbonated water to 1 part syrup. This is normally achieved through two flow regulator systems that adjust in order to create exact numbers. For example, one flow regulator adjusts regardless of fluid pressure to create a syrup flow rate of 0.25 ounce/second. Likewise, the second flow regulator adjusts regardless of fluid pressure to create a water flow rate of 1.25 ounces/second. While two adjustable flow regulators deliver a proper water to syrup ratio, it does increases the expense of beverage dispensing valves.

In the present embodiment of the modular flow regulator system 1, the flow regulator 200, which maintains the flow rate of diluent, is non-adjustable, whereas the flow regulator 400, which maintains the flow rate of syrup is adjustable. Because the modular flow regulator system 1 operates over a large range of pressures, the modular flow regulator system 1 only needs the adjustable flow regulator 400. This greatly decreases the production costs of the beverage dispenser valve sub-assembly 10.

In order to achieve the proper diluent to syrup ratio, (5 parts carbonated water to 1 part syrup) a user would measure the flow rate of diluent through the diluent conduit 26. Once the flow rate of the diluent through the diluent conduit 26 is measured, the user would then calculate a flow rate for the syrup that gives a desired diluent to syrup ratio. Illustratively, the user divides the measured diluent flow rate by the desired flow rate ratio to determine the desired syrup flow rate. After calculating the flow rate of syrup, the user adjusts the flow regulator 400 such that syrup flowing through the syrup conduit 24 is delivered at a rate that gives the desired diluent to syrup ratio. For example, if the diluent to syrup ratio is 5:1 and the flow rate of diluent through the diluent conduit 26 is measured at 6 ounces per second, the syrup flow rate through the syrup conduit 24 must be at 1.2 ounces per second in order to realize the proper diluent to syrup ratio. To achieve the proper flow rate through the syrup conduit 24, the flow regulator 400 is adjusted by rotating the engaging surface of the base until a flow rate of 1.2 ounces per second is attained. With the flow rate through the diluent conduit 26 at 6 ounces per second and the flow rate through the syrup conduit 24 at 1.2 ounces per second, a beverage is delivered to a user at the proper diluent to syrup ratio of 5:1.

In addition the proper diluent to syrup ratio, (5 parts carbonated water to 1 part syrup) may be achieved in the following manner. The flow rate of diluent through the diluent conduit 26 is measured, then the total flow rate of the diluent conduit 26 combined with the syrup conduit 24 is measured. After measuring the total flow rate, the syrup conduit 24 is adjusted to give the proper diluent to syrup ratio. For example, if the flow rate of diluent through the diluent conduit 26 is measured at 6 ounces per second, to achieve the proper diluent to syrup ratio the total flow rate of the diluent and the syrup must be 7.2 ounces per second. To achieve the proper total flow rate, the flow regulator 400 is adjusted. In particular, the flow regulator 400 which is placed in the syrup conduit 24 is adjusted by rotating the engaging surface of the base until a total flow rate of 7.2 ounces per second is attained, thereby giving the desired 5:1 diluent to syrup ratio.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

The invention claimed is:

1. A flow regulator system, comprising:
a flow regulator adapted for placement within a fluid flow path, the flow regulator being adapted to maintain fluid flowing through the fluid flow path at a desired flow rate, the flow regulator, comprising:
a flow washer including an orifice therethrough, and
a regulator body adapted to receive the flow washer, the regulator body including at least one flow washer stop entirely spaced apart from the flow washer, wherein, at fluid pressures between a first fluid pressure and a second fluid pressure, the flow washer remains spaced apart from the at least one flow washer stop such that the flow washer rotationally deforms to decrease or increase the size of the orifice thereby maintaining the desired flow rate of fluid within the fluid flow path, further wherein, at fluid pressures greater than or equal to the second fluid pressure, the flow washer rotationally deforms and contacts the at least one flow washer stop to prevent further rotational deformation thereof such that the flow washer radially compresses or expands to decrease or increase the size of the orifice thereby maintaining the desired flow rate of fluid within the fluid flow path.

2. The flow regulator system according to claim 1, wherein the regulator body, includes:
a flow washer seat that receives the flow washer therein;
a diffuser assembly disposed in the flow washer seat, wherein the flow washer and the diffuser assembly form a delivery path, further wherein the orifice of the flow washer communicates with the delivery path to transport fluid thereto;
a fluid conduit including a fluid conduit inlet and a fluid conduit outlet, wherein the delivery path communicates with the fluid conduit inlet to transport fluid thereto.

3. The flow regulator system according to claim 2, wherein, the flow washer comprises a plate disposed on a support wall, wherein the plate includes the orifice therethrough, further wherein, between the first fluid pressure and the second fluid pressure, the support wall rotates to increase or decrease the size of the orifice.

4. The flow regulator system according to claim 3, wherein, at fluid pressures greater than or equal to the second fluid pressure, the flow washer contacts the at least one flow washer stop thereby preventing a rotation of the support wall that decreases the size of the orifice.

5. The flow regulator system according to claim 4, wherein, when fluid pressure decreases below the second fluid pressure, the support wall of the flow washer rotates such that the flow washer ceases contact with the at least one flow washer stop.

6. The flow regulator system according to claim 3, wherein the flow washer seat comprises:
   a wall; and
   a flow washer receiving surface adjoining the wall, wherein the support wall of the flow washer resides on the flow washer receiving surface adjacent the wall.

7. The flow regulator system according to claim 6, wherein, at fluid pressures greater than or equal to the second fluid pressure, accumulation of fluid between the support wall of the flow washer and the wall of the flow washer seat radially compresses the support wall of the flow washer resulting in a decrease in the diameter of the orifice that maintains the desired flow rate of fluid within the fluid flow path, and reduction of fluid between the support wall of the flow washer and the wall of the flow washer seat radially expands the support wall of the flow washer resulting in an increase in the diameter of the orifice that maintains the desired flow rate of fluid within the fluid flow path.

8. The flow regulator system according to claim 6, wherein the plate of the flow washer includes an inlet surface and an outlet surface, further wherein the outlet surface of the plate and the support wall define a cavity therebetween.

9. The flow regulator system according to claim 8, wherein fluid flowing through the flow path contacts the inlet surface of the plate creating pressure thereon such that fluid is forced through the orifice of the flow washer.

10. The flow regulator system according to claim 9, wherein filling of the delivery path with fluid equalizes fluid pressure within the cavity of the flow washer thereby stabilizing the flow of fluid through the flow washer and preventing vibration of the flow washer within the flow washer seat.

11. The flow regulator system according to claim 10, wherein fluid collected in the delivery path enters the fluid conduit inlet for conveyance to the fluid conduit outlet via the fluid conduit.

12. The flow regulator system according to claim 11, wherein, when fluid flowing through the flow path and contacting the inlet surface of the plate creates fluid pressures between the first fluid pressure and the second fluid pressure, the support wall of the flow washer in response to increasing fluid pressures rotates inwardly around an inner rim to decrease the diameter of the orifice thereby maintaining the desired flow rate of fluid within the fluid flow path, the support wall of the flow washer in response to decreasing fluid pressures rotates outwardly around an inner rim to increase the diameter of the orifice thereby maintaining the desired flow rate of fluid within the fluid flow path.

13. The flow regulator system according to claim 12 wherein when fluid flowing through the flow path and contacting the inlet surface of the plate creates fluid pressures greater than or equal to the second fluid pressure, the flow washer contacts a portion of the regulator body to prevent further rotational deformation of the flow washer, in response to increasing fluid pressures, fluid accumulates between the support wall of the flow washer and the wall of the flow washer seat such that the flow washer radially compresses to decrease the size of the orifice thereby maintaining the desired flow rate of fluid within the fluid flow path, in response to decreasing fluid pressures results in reduction of fluid between the support wall of the flow washer and the wall of the flow washer seat such that the flow washer radially expands to increase the size of the orifice thereby maintaining the desired flow rate of fluid within the fluid flow path.

14. The flow regulator system according to claim 6, wherein the diffuser assembly comprises:
   a diffuser disposed centrally in the flow washer seat;
   the at least one flow washer stop disposed adjacent the diffuser, wherein the flow washer stop engages the flow washer at fluid pressures greater than or equal to the second fluid pressure to prevent a rotation of the support wall that decreases the size of the orifice; and
   at least one diffuser channel, the delivery path comprising the diffuser channel and a circumferential channel defined by the flow washer and the diffuser assembly, wherein the diffuser transports fluid from the orifice of the flow washer into the diffuser channel, further wherein the diffuser channel transports fluid into the circumferential channel.

15. The flow regulator system according to claim 14, wherein, at fluid pressures greater than or equal to the second fluid pressure fluid, the engagement of the flow washer by the flow washer stop seals a portion of the delivery channel such that fluid passing through the orifice contacts the diffuser and enters the diffuser channel, further wherein the diffuser channel transports the fluid to the circumferential channel such that the fluid collects in the circumferential channel and enters the conduit inlet for conveyance to the outlet via the fluid conduit.

16. The flow regulator system according to claim 14, wherein, at fluid pressures greater than or equal to the second fluid pressure, accumulation of fluid between the support wall of the flow washer and the wall of the flow washer seat radially compresses the support wall of the flow washer resulting in a decrease in the diameter of the orifice that maintains the desired flow rate of fluid within the fluid flow path, and reduction of fluid between the support wall of the flow washer and the wall of the flow washer seat radially expands the support wall of the flow washer resulting in an increase in the diameter of the orifice that maintains the desired flow rate of fluid within the fluid flow path.

17. The flow regulator system according to claim 6, wherein the diffuser assembly comprises:
   a diffuser disposed centrally in the flow washer seat;
   the at least one flow washer stop disposed adjacent the diffuser, wherein the flow washer stop engages the flow washer at fluid pressures greater than or equal to the second fluid pressure to prevent a rotation of the support wall that decreases the size of the orifice; and
   at least one diffuser channel communicating with a circumferential channel defined by the flow washer and the at least one flow washer stop, wherein the diffuser transports fluid from the orifice of the flow washer into the diffuser channel, further wherein the diffuser channel transports fluid into the circumferential channel such that the filling of the circumferential channel with fluid equalizes fluid pressure within a cavity of the flow washer thereby stabilizing the flow of fluid through the flow washer and preventing vibration of the flow washer within the flow washer seat.

18. The flow regulator system according to claim 17, wherein, at fluid pressures greater than or equal to the second fluid pressure, accumulation of fluid between the support wall of the flow washer and the wall of the flow washer seat radially compresses the support wall of the flow washer resulting in a decrease in the diameter of the orifice that maintains the desired flow rate of fluid within the fluid flow path, and reduction of fluid between the support wall of the flow washer and the wall of the flow washer seat radially expands the support wall of the flow washer resulting in an increase in the diameter of the orifice that maintains the desired flow rate of fluid within the fluid flow path.

19. The flow regulator system according to claim 17, wherein extension of the diffuser into the orifice of the flow washer decreases the fluid flow rate within the fluid flow path and retraction of the diffuser from the orifice of the flow washer increases the fluid flow rate within the fluid flow path.

20. The flow regulator system according to claim 17, wherein the regulator body further includes a fluid chamber communicating with the fluid conduit outlet of the fluid conduit.

21. The flow regulator system according to claim 20, wherein the diffuser assembly, further comprises:
- a base installed within the fluid chamber, wherein the base is linearly adjustable within the fluid chamber; and
- the diffuser comprises a shaft disposed within the base and a tip, further wherein linear adjustment of the base that extends the tip into the orifice of the flow washer decreases the fluid flow rate within the fluid flow path and linear adjustment of the base that retracts the tip from the orifice of the flow washer increases the fluid flow rate within the fluid flow path.

\* \* \* \* \*